United States Patent
Beattie et al.

(10) Patent No.: US 12,373,033 B2
(45) Date of Patent: Jul. 29, 2025

(54) MID-AIR HAPTIC TEXTURES

(71) Applicant: Ultrahaptics IP Ltd, Bristol (GB)

(72) Inventors: David Beattie, Bristol (GB); Rory Clark, Bristol (GB)

(73) Assignee: ULTRAHAPTICS IP LTD, Bristol (GB)

( * ) Notice: Subject to any disclaimer, the term of this patent is extended or adjusted under 35 U.S.C. 154(b) by 135 days.

(21) Appl. No.: 18/153,337

(22) Filed: Jan. 11, 2023

(65) Prior Publication Data

US 2024/0231492 A1 Jul. 11, 2024

Related U.S. Application Data

(63) Continuation of application No. PCT/GB2020/050013, filed on Jan. 6, 2020.
(Continued)

(51) Int. Cl.
*G06F 3/01* (2006.01)
*G06T 7/42* (2017.01)
(Continued)

(52) U.S. Cl.
CPC ............. *G06F 3/016* (2013.01); *G06F 3/011* (2013.01); *G06T 7/42* (2017.01); *G06T 7/44* (2017.01);
(Continued)

(58) Field of Classification Search
CPC .... G06T 7/42; G06T 7/45; G06T 7/44; G06T 2207/20084; G06T 2207/20056; G06T 2207/20081; G06F 3/011; G06F 3/016
See application file for complete search history.

(56) References Cited

U.S. PATENT DOCUMENTS 4,218,921 A   8/1980  Berge
4,760,525 A   7/1988  Webb
(Continued)

FOREIGN PATENT DOCUMENTS

CA   2470115 A1   6/2003
CA   2909804 A1   11/2014
(Continued)

OTHER PUBLICATIONS

ISR for PCT/GB2020/053373 (Mar. 26, 2021) (16 pages).
(Continued)

*Primary Examiner* — Doon Y Chow
(74) *Attorney, Agent, or Firm* — Koffsky Schwalb LLC; Mark I. Koffsky

(57) ABSTRACT

Described is a method for instilling the haptic dimension of texture to virtual and holographic objects using mid-air ultrasonic technology. A set of features is extracted from imported images using their associated displacement maps. Textural qualities such as the micro and macro roughness are then computed and fed to a haptic mapping function together with information about the dynamic motion of the user's hands during holographic touch. Mid-air haptic textures are then synthesized and projected onto the user's bare hands. Further, mid-air haptic technology enables tactile exploration of virtual objects in digital environments. When a user's prior and current expectations and rendered tactile texture differ, user immersion can break. A study aims at mitigating this by integrating user expectations into the rendering algorithm of mid-air haptic textures and establishes a relationship between visual and mid-air haptic roughness.

6 Claims, 10 Drawing Sheets

Related U.S. Application Data

(60) Provisional application No. 62/788,322, filed on Jan. 4, 2019, provisional application No. 62/945,272, filed on Dec. 9, 2019.

(51) Int. Cl.
  *G06T 7/44* (2017.01)
  *G06T 7/45* (2017.01)

(52) U.S. Cl.
  CPC ...... *G06T 7/45* (2017.01); *G06T 2207/20056* (2013.01); *G06T 2207/20081* (2013.01); *G06T 2207/20084* (2013.01)

(56) References Cited

U.S. PATENT DOCUMENTS

| | | |
|---|---|---|
| 4,771,205 A | 9/1988 | Mequio |
| 4,881,212 A | 11/1989 | Takeuchi |
| 5,122,993 A | 6/1992 | Hikita |
| 5,226,000 A | 7/1993 | Moses |
| 5,235,986 A | 8/1993 | Maslak |
| 5,243,344 A | 9/1993 | Koulopoulos |
| 5,329,682 A | 7/1994 | Thurn |
| 5,371,834 A | 12/1994 | Tawel |
| 5,422,431 A | 6/1995 | Ichiki |
| 5,426,388 A | 6/1995 | Flora |
| 5,477,736 A | 12/1995 | Lorraine |
| 5,511,296 A | 4/1996 | Dias |
| 5,729,694 A | 3/1998 | Holzrichter |
| 5,859,915 A | 1/1999 | Norris |
| 6,029,518 A | 2/2000 | Oeftering |
| 6,193,936 B1 | 2/2001 | Gardner |
| 6,216,538 B1 | 4/2001 | Yasuda |
| 6,436,051 B1 | 8/2002 | Morris |
| 6,503,204 B1 | 1/2003 | Sumanaweera |
| 6,533,455 B2 | 3/2003 | Graumann |
| 6,647,359 B1 | 11/2003 | Verplank |
| 6,771,294 B1 | 8/2004 | Pulli |
| 6,772,490 B2 | 8/2004 | Toda |
| 6,800,987 B2 | 10/2004 | Toda |
| 7,107,159 B2 | 9/2006 | German |
| 7,109,789 B2 | 9/2006 | Spencer |
| 7,154,928 B2 | 12/2006 | Sandstrom |
| 7,182,726 B2 | 2/2007 | Williams |
| 7,225,404 B1 | 5/2007 | Zilles |
| 7,284,027 B2 | 10/2007 | Jennings, III |
| 7,345,600 B1 | 3/2008 | Fedigan |
| 7,487,662 B2 | 2/2009 | Schabron |
| 7,497,662 B2 | 3/2009 | Mollmann |
| 7,577,260 B1 | 8/2009 | Hooley |
| 7,692,661 B2 | 4/2010 | Cook |
| RE42,192 E | 3/2011 | Schabron |
| 7,966,134 B2 | 6/2011 | German |
| 8,000,481 B2 | 8/2011 | Nishikawa |
| 8,123,502 B2 | 2/2012 | Blakey |
| 8,269,168 B1 | 9/2012 | Axelrod |
| 8,279,193 B1 | 10/2012 | Birnbaum |
| 8,351,646 B2 | 1/2013 | Fujimura |
| 8,369,973 B2 | 2/2013 | Risbo |
| 8,594,350 B2 | 11/2013 | Hooley |
| 8,607,922 B1 | 12/2013 | Werner |
| 8,782,109 B2 | 7/2014 | Tsutsui |
| 8,823,674 B2 | 9/2014 | Birnbaum |
| 8,833,510 B2 | 9/2014 | Koh |
| 8,884,927 B1 | 11/2014 | Cheatham, III |
| 9,208,664 B1 | 12/2015 | Peters |
| 9,267,735 B2 | 2/2016 | Funayama |
| 9,421,291 B2 | 8/2016 | Robert |
| 9,612,658 B2 | 4/2017 | Subramanian |
| 9,662,680 B2 | 5/2017 | Yamamoto |
| 9,667,173 B1 | 5/2017 | Kappus |
| 9,786,092 B2 | 10/2017 | Santhanam |
| 9,795,446 B2 | 10/2017 | Dimaio |
| 9,816,757 B1 | 11/2017 | Zielinski |
| 9,841,819 B2 | 12/2017 | Carter |
| 9,863,699 B2 | 1/2018 | Corbin, III |
| 9,898,089 B2 | 2/2018 | Subramanian |
| 9,936,908 B1 | 4/2018 | Acosta |
| 9,945,818 B2 | 4/2018 | Ganti |
| 9,958,943 B2 | 5/2018 | Long |
| 9,977,120 B2 | 5/2018 | Carter |
| 10,101,811 B2 | 10/2018 | Carter |
| 10,101,814 B2 | 10/2018 | Carter |
| 10,133,353 B2 | 11/2018 | Eid |
| 10,140,776 B2 | 11/2018 | Schwarz |
| 10,146,353 B1 | 12/2018 | Smith |
| 10,168,782 B1 | 1/2019 | Tchon |
| 10,268,275 B2 | 4/2019 | Carter |
| 10,281,567 B2 | 5/2019 | Carter |
| 10,318,008 B2 | 6/2019 | Sinha |
| 10,383,694 B1 * | 8/2019 | Venkataraman ........ G16H 40/63 |
| 10,444,842 B2 | 10/2019 | Long |
| 10,469,973 B2 | 11/2019 | Hayashi |
| 10,496,175 B2 | 12/2019 | Long |
| 10,497,358 B2 | 12/2019 | Tester |
| 10,510,357 B2 | 12/2019 | Kovesi |
| 10,520,252 B2 | 12/2019 | Momen |
| 10,523,159 B2 | 12/2019 | Megretski |
| 10,531,212 B2 | 1/2020 | Long |
| 10,535,174 B1 | 1/2020 | Rigiroli |
| 10,569,300 B2 | 2/2020 | Hoshi |
| 10,593,101 B1 | 3/2020 | Han |
| 10,599,434 B1 | 3/2020 | Barrett |
| 10,657,704 B1 | 5/2020 | Han |
| 10,685,538 B2 | 6/2020 | Carter |
| 10,755,538 B2 | 8/2020 | Carter |
| 10,818,162 B2 | 10/2020 | Carter |
| 10,911,861 B2 | 2/2021 | Buckland |
| 10,915,177 B2 | 2/2021 | Carter |
| 10,921,890 B2 | 2/2021 | Subramanian |
| 10,930,123 B2 | 2/2021 | Carter |
| 10,943,578 B2 | 3/2021 | Long |
| 10,991,074 B2 | 4/2021 | Bousmalis |
| 11,048,329 B1 | 6/2021 | Lee |
| 11,080,874 B1 | 8/2021 | Bardagjy |
| 11,098,951 B2 | 8/2021 | Kappus |
| 11,106,273 B2 | 8/2021 | Hazra |
| 11,113,860 B2 | 9/2021 | Rigiroli |
| 11,125,866 B2 | 9/2021 | Sumi |
| 11,169,610 B2 | 11/2021 | Sarafianou |
| 11,189,140 B2 | 11/2021 | Long |
| 11,204,644 B2 | 12/2021 | Long |
| 11,276,281 B2 | 3/2022 | Carter |
| 11,334,165 B1 * | 5/2022 | Clements ............... B66B 1/468 |
| 11,350,909 B2 | 6/2022 | Maresca |
| 11,475,247 B2 | 10/2022 | Nikolenko |
| 11,531,395 B2 | 12/2022 | Kappus |
| 11,543,507 B2 | 1/2023 | Carter |
| 11,550,395 B2 | 1/2023 | Beattie |
| 11,550,432 B2 | 1/2023 | Carter |
| 11,553,295 B2 | 1/2023 | Kappus |
| 11,669,661 B2 | 6/2023 | Mirzendehdel |
| 11,693,113 B2 | 7/2023 | Bachmann |
| 11,704,983 B2 | 7/2023 | Long |
| 11,714,492 B2 | 8/2023 | Carter |
| 11,715,453 B2 | 8/2023 | Kappus |
| 11,727,790 B2 | 8/2023 | Carter |
| 11,740,018 B2 | 8/2023 | Kappus |
| 11,742,870 B2 | 8/2023 | Long |
| 11,768,540 B2 | 9/2023 | Long |
| 11,816,267 B2 | 11/2023 | Kappus |
| 11,830,351 B2 | 11/2023 | Carter |
| 11,830,352 B1 * | 11/2023 | Agrawal ................. G08B 6/00 |
| 11,842,517 B2 | 12/2023 | Lyons |
| 11,886,639 B2 | 1/2024 | Brown |
| 11,921,928 B2 | 3/2024 | Iodice |
| 11,955,109 B2 | 4/2024 | Long |
| 12,100,288 B2 | 9/2024 | Carter |
| 12,158,522 B2 | 12/2024 | Iodice |
| 2001/0007591 A1 | 7/2001 | Pompei |
| 2001/0033124 A1 | 10/2001 | Norris |
| 2001/0053204 A1 | 12/2001 | Navab |
| 2002/0149570 A1 | 10/2002 | Knowles |
| 2003/0024317 A1 | 2/2003 | Miller |

(56) References Cited

U.S. PATENT DOCUMENTS

| | | |
|---|---|---|
| 2003/0144032 A1 | 7/2003 | Brunner |
| 2003/0182647 A1 | 9/2003 | Radeskog |
| 2004/0005715 A1 | 1/2004 | Schabron |
| 2004/0014434 A1 | 1/2004 | Haardt |
| 2004/0052387 A1 | 3/2004 | Norris |
| 2004/0091119 A1 | 5/2004 | Duraiswami |
| 2004/0210158 A1 | 10/2004 | Organ |
| 2004/0226378 A1 | 11/2004 | Oda |
| 2004/0264707 A1 | 12/2004 | Yang |
| 2005/0052714 A1 | 3/2005 | Klug |
| 2005/0056851 A1 | 3/2005 | Althaus |
| 2005/0148874 A1 | 7/2005 | Brock-Fisher et al. |
| 2005/0212760 A1 | 9/2005 | Marvit |
| 2005/0226437 A1 | 10/2005 | Pellegrini |
| 2005/0267695 A1 | 12/2005 | German |
| 2005/0273483 A1 | 12/2005 | Dent |
| 2006/0085049 A1 | 4/2006 | Cory |
| 2006/0090955 A1 | 5/2006 | Cardas |
| 2006/0091301 A1 | 5/2006 | Trisnadi |
| 2006/0164428 A1 | 7/2006 | Cook |
| 2007/0036492 A1 | 2/2007 | Lee |
| 2007/0056374 A1 | 3/2007 | Andrews |
| 2007/0094317 A1 | 4/2007 | Wang |
| 2007/0177681 A1 | 8/2007 | Choi |
| 2007/0214462 A1 | 9/2007 | Boillot |
| 2007/0216711 A1 | 9/2007 | Smith |
| 2007/0236450 A1 | 10/2007 | Colgate |
| 2007/0263741 A1 | 11/2007 | Erving |
| 2008/0012647 A1 | 1/2008 | Risbo |
| 2008/0027686 A1 | 1/2008 | Mollmann |
| 2008/0084789 A1 | 4/2008 | Altman |
| 2008/0130906 A1 | 6/2008 | Goldstein |
| 2008/0152191 A1 | 6/2008 | Fujimura |
| 2008/0226088 A1 | 9/2008 | Aarts |
| 2008/0273723 A1 | 11/2008 | Hartung |
| 2008/0291198 A1 | 11/2008 | Chun |
| 2008/0300055 A1 | 12/2008 | Lutnick |
| 2009/0093724 A1 | 4/2009 | Pernot |
| 2009/0116660 A1 | 5/2009 | Croft, III |
| 2009/0232684 A1 | 9/2009 | Hirata |
| 2009/0251421 A1 | 10/2009 | Bloebaum |
| 2009/0319065 A1 | 12/2009 | Risbo |
| 2010/0013613 A1 | 1/2010 | Weston |
| 2010/0016727 A1 | 1/2010 | Rosenberg |
| 2010/0030076 A1 | 2/2010 | Vortman |
| 2010/0044120 A1 | 2/2010 | Richter |
| 2010/0066512 A1 | 3/2010 | Rank |
| 2010/0085168 A1 | 4/2010 | Kyung |
| 2010/0103246 A1 | 4/2010 | Schwerdtner |
| 2010/0109481 A1 | 5/2010 | Buccafusca |
| 2010/0199232 A1 | 8/2010 | Mistry |
| 2010/0231508 A1 | 9/2010 | Cruz-Hernandez |
| 2010/0262008 A1 | 10/2010 | Roundhill |
| 2010/0302015 A1 | 12/2010 | Kipman |
| 2010/0321216 A1 | 12/2010 | Jonsson |
| 2011/0006888 A1 | 1/2011 | Bae |
| 2011/0010958 A1 | 1/2011 | Clark |
| 2011/0051554 A1 | 3/2011 | Varray |
| 2011/0066032 A1 | 3/2011 | Shuki |
| 2011/0134225 A1 | 6/2011 | Saint-Pierre |
| 2011/0199342 A1 | 8/2011 | Vartanian |
| 2011/0310028 A1 | 12/2011 | Camp, Jr. |
| 2012/0057733 A1 | 3/2012 | Morii |
| 2012/0063628 A1 | 3/2012 | Rizzello |
| 2012/0066280 A1 | 3/2012 | Tsutsui |
| 2012/0113223 A1* | 5/2012 | Hilliges .................. G06F 3/011 348/46 |
| 2012/0223880 A1 | 9/2012 | Birnbaum |
| 2012/0223400 A1 | 9/2012 | Birnbaum |
| 2012/0229401 A1 | 9/2012 | Birnbaum |
| 2012/0236689 A1 | 9/2012 | Brown |
| 2012/0243374 A1 | 9/2012 | Dahl |
| 2012/0249409 A1 | 10/2012 | Toney |
| 2012/0249474 A1 | 10/2012 | Pratt |
| 2012/0299853 A1 | 11/2012 | Dagar |
| 2012/0307649 A1 | 12/2012 | Park |
| 2012/0315605 A1 | 12/2012 | Cho |
| 2013/0035582 A1 | 2/2013 | Radulescu |
| 2013/0079621 A1 | 3/2013 | Shoham |
| 2013/0094678 A1 | 4/2013 | Scholte |
| 2013/0100008 A1 | 4/2013 | Marti |
| 2013/0101141 A1 | 4/2013 | McElveen |
| 2013/0173658 A1 | 7/2013 | Adelman |
| 2013/0271397 A1 | 10/2013 | MacDougall et al. |
| 2013/0331705 A1 | 12/2013 | Fraser |
| 2014/0027201 A1 | 1/2014 | Islam |
| 2014/0104274 A1 | 4/2014 | Hilliges |
| 2014/0139071 A1 | 5/2014 | Yamamoto |
| 2014/0168091 A1 | 6/2014 | Jones |
| 2014/0201666 A1 | 7/2014 | Bedikian |
| 2014/0204002 A1 | 7/2014 | Bennet |
| 2014/0265572 A1 | 9/2014 | Siedenburg |
| 2014/0267065 A1 | 9/2014 | Levesque |
| 2014/0269207 A1 | 9/2014 | Baym |
| 2014/0269208 A1 | 9/2014 | Baym |
| 2014/0269214 A1 | 9/2014 | Baym |
| 2014/0270305 A1 | 9/2014 | Baym |
| 2014/0306891 A1* | 10/2014 | Latta .................. G02B 27/017 345/158 |
| 2014/0320436 A1 | 10/2014 | Modarres |
| 2014/0361988 A1 | 12/2014 | Katz |
| 2014/0369514 A1 | 12/2014 | Baym |
| 2015/0002477 A1 | 1/2015 | Cheatham, III |
| 2015/0002517 A1 | 1/2015 | Lee |
| 2015/0005039 A1 | 1/2015 | Liu |
| 2015/0006645 A1 | 1/2015 | Oh |
| 2015/0007025 A1 | 1/2015 | Sassi |
| 2015/0013023 A1 | 1/2015 | Wang |
| 2015/0019299 A1 | 1/2015 | Harvey |
| 2015/0022466 A1 | 1/2015 | Levesque |
| 2015/0029155 A1 | 1/2015 | Lee |
| 2015/0066445 A1 | 3/2015 | Lin |
| 2015/0070147 A1 | 3/2015 | Cruz-Hernandez |
| 2015/0070245 A1 | 3/2015 | Han |
| 2015/0078136 A1 | 3/2015 | Sun |
| 2015/0081110 A1 | 3/2015 | Houston |
| 2015/0084929 A1 | 3/2015 | Lee |
| 2015/0110310 A1 | 4/2015 | Minnaar |
| 2015/0130323 A1 | 5/2015 | Harris |
| 2015/0168205 A1 | 6/2015 | Lee |
| 2015/0187134 A1 | 7/2015 | Baecher |
| 2015/0192995 A1 | 7/2015 | Subramanian |
| 2015/0209564 A1 | 7/2015 | Lewin et al. |
| 2015/0220199 A1 | 8/2015 | Wang |
| 2015/0226537 A1 | 8/2015 | Schorre |
| 2015/0226831 A1 | 8/2015 | Nakamura |
| 2015/0241393 A1 | 8/2015 | Ganti |
| 2015/0248787 A1 | 9/2015 | Abovitz |
| 2015/0258431 A1 | 9/2015 | Stafford |
| 2015/0277610 A1 | 10/2015 | Kim |
| 2015/0293592 A1 | 10/2015 | Cheong |
| 2015/0304789 A1 | 10/2015 | Babayoff |
| 2015/0309629 A1 | 10/2015 | Amariutei et al. |
| 2015/0323667 A1 | 11/2015 | Przybyla |
| 2015/0331576 A1 | 11/2015 | Piya |
| 2015/0332075 A1 | 11/2015 | Burch |
| 2016/0019762 A1 | 1/2016 | Levesque |
| 2016/0019879 A1 | 1/2016 | Daley |
| 2016/0026253 A1 | 1/2016 | Bradski |
| 2016/0044417 A1 | 2/2016 | Clemen, Jr. |
| 2016/0124080 A1 | 5/2016 | Carter |
| 2016/0138986 A1 | 5/2016 | Carlin |
| 2016/0175701 A1 | 6/2016 | Froy |
| 2016/0175709 A1 | 6/2016 | Idris |
| 2016/0189702 A1 | 6/2016 | Blanc |
| 2016/0242724 A1 | 8/2016 | Lavallee |
| 2016/0246374 A1 | 8/2016 | Carter |
| 2016/0249150 A1 | 8/2016 | Carter |
| 2016/0291716 A1 | 10/2016 | Boser |
| 2016/0306423 A1 | 10/2016 | Uttermann |
| 2016/0320843 A1 | 11/2016 | Long |
| 2016/0339132 A1 | 11/2016 | Cosman |
| 2016/0358477 A1 | 12/2016 | Ansari |
| 2016/0374562 A1 | 12/2016 | Vertikov |

(56) References Cited

U.S. PATENT DOCUMENTS

| | | |
|---|---|---|
| 2017/0002839 A1 | 1/2017 | Bukland |
| 2017/0004819 A1 | 1/2017 | Ochiai |
| 2017/0018171 A1 | 1/2017 | Carter |
| 2017/0024921 A1 | 1/2017 | Beeler |
| 2017/0052148 A1 | 2/2017 | Estevez |
| 2017/0123487 A1 | 5/2017 | Hazra |
| 2017/0123499 A1 | 5/2017 | Eid |
| 2017/0140552 A1 | 5/2017 | Woo |
| 2017/0144190 A1 | 5/2017 | Hoshi |
| 2017/0153707 A1 | 6/2017 | Subramanian |
| 2017/0168586 A1 | 6/2017 | Sinha |
| 2017/0181725 A1 | 6/2017 | Han |
| 2017/0193768 A1 | 7/2017 | Long |
| 2017/0193823 A1 | 7/2017 | Jiang |
| 2017/0211022 A1 | 7/2017 | Reinke |
| 2017/0236506 A1 | 8/2017 | Przybyla |
| 2017/0249932 A1 | 8/2017 | Maxwell et al. |
| 2017/0270356 A1 | 9/2017 | Sills |
| 2017/0279951 A1 | 9/2017 | Hwang |
| 2017/0336860 A1 | 11/2017 | Smoot |
| 2017/0366908 A1 | 12/2017 | Long |
| 2018/0018787 A1 | 1/2018 | Giancola |
| 2018/0035891 A1 | 2/2018 | Van Soest |
| 2018/0039333 A1 | 2/2018 | Carter |
| 2018/0047259 A1 | 2/2018 | Carter |
| 2018/0074580 A1 | 3/2018 | Hardee |
| 2018/0081439 A1 | 3/2018 | Daniels |
| 2018/0101234 A1 | 4/2018 | Carter |
| 2018/0139557 A1 | 5/2018 | Ochiai |
| 2018/0146306 A1 | 5/2018 | Benattar |
| 2018/0151035 A1 | 5/2018 | Maalouf |
| 2018/0166063 A1 | 6/2018 | Long |
| 2018/0181203 A1 | 6/2018 | Subramanian |
| 2018/0182372 A1 | 6/2018 | Tester |
| 2018/0190007 A1 | 7/2018 | Panteleev |
| 2018/0246576 A1 | 8/2018 | Long |
| 2018/0253627 A1 | 9/2018 | Baradel |
| 2018/0263708 A1 | 9/2018 | Kim |
| 2018/0267156 A1 | 9/2018 | Carter |
| 2018/0271494 A1 | 9/2018 | Cuscuna |
| 2018/0304310 A1 | 10/2018 | Long |
| 2018/0309515 A1 | 10/2018 | Murakowski |
| 2018/0310111 A1 | 10/2018 | Kappus |
| 2018/0350339 A1 | 12/2018 | Macours |
| 2018/0361174 A1 | 12/2018 | Radulescu |
| 2019/0001129 A1 | 1/2019 | Rosenbluth |
| 2019/0038496 A1 | 2/2019 | Levesque |
| 2019/0091565 A1 | 3/2019 | Nelson |
| 2019/0163275 A1 | 5/2019 | Iodice |
| 2019/0175077 A1 | 6/2019 | Zhang |
| 2019/0187244 A1 | 6/2019 | Riccardi |
| 2019/0196578 A1 | 6/2019 | Michele |
| 2019/0196591 A1 | 6/2019 | Long |
| 2019/0197840 A1 | 6/2019 | Kappus |
| 2019/0197841 A1 | 6/2019 | Carter |
| 2019/0197842 A1 | 6/2019 | Long |
| 2019/0204925 A1 | 7/2019 | Long |
| 2019/0206202 A1 | 7/2019 | Carter |
| 2019/0235628 A1 | 8/2019 | Lacroix |
| 2019/0257932 A1 | 8/2019 | Carter |
| 2019/0310710 A1 | 10/2019 | Deeley |
| 2019/0342654 A1 | 11/2019 | Buckland |
| 2020/0042091 A1 | 2/2020 | Long |
| 2020/0080776 A1 | 3/2020 | Kappus |
| 2020/0082221 A1 | 3/2020 | Tsai |
| 2020/0082804 A1 | 3/2020 | Kappus |
| 2020/0103974 A1 | 4/2020 | Carter |
| 2020/0117229 A1 | 4/2020 | Long |
| 2020/0117993 A1 | 4/2020 | Martinez-Canales |
| 2020/0193269 A1 | 6/2020 | Park |
| 2020/0218354 A1 | 7/2020 | Beattie |
| 2020/0257371 A1 | 8/2020 | Sung |
| 2020/0285888 A1 | 9/2020 | Borar |
| 2020/0294299 A1 | 9/2020 | Rigiroli |
| 2020/0302760 A1 | 9/2020 | Carter |
| 2020/0320347 A1 | 10/2020 | Nikolenko |
| 2020/0320351 A1 | 10/2020 | Nikolenko |
| 2020/0327418 A1 | 10/2020 | Lyons |
| 2020/0380832 A1 | 12/2020 | Carter |
| 2021/0037332 A1 | 2/2021 | Kappus |
| 2021/0043070 A1 | 2/2021 | Carter |
| 2021/0056693 A1 | 2/2021 | Cheng |
| 2021/0109712 A1 | 4/2021 | Oliver |
| 2021/0111731 A1 | 4/2021 | Oliver |
| 2021/0112353 A1 | 4/2021 | Kappus |
| 2021/0141458 A1 | 5/2021 | Sarafianou |
| 2021/0162457 A1 | 6/2021 | Ebefors |
| 2021/0165491 A1 | 6/2021 | Sun |
| 2021/0170447 A1 | 6/2021 | Buckland |
| 2021/0183215 A1 | 6/2021 | Carter |
| 2021/0201884 A1 | 7/2021 | Kappus |
| 2021/0225355 A1 | 7/2021 | Long |
| 2021/0275141 A1 | 9/2021 | Eckersley |
| 2021/0294419 A1 | 9/2021 | Lee |
| 2021/0303072 A1 | 9/2021 | Carter |
| 2021/0303758 A1 | 9/2021 | Long |
| 2021/0334706 A1 | 10/2021 | Yamaguchi |
| 2021/0381765 A1 | 12/2021 | Kappus |
| 2021/0397261 A1 | 12/2021 | Kappus |
| 2022/0000447 A1 | 1/2022 | Eibl |
| 2022/0035479 A1 | 2/2022 | Lasater |
| 2022/0083142 A1 | 3/2022 | Brown |
| 2022/0095068 A1 | 3/2022 | Kappus |
| 2022/0113806 A1 | 4/2022 | Long |
| 2022/0155949 A1 | 5/2022 | Ring |
| 2022/0198892 A1 | 6/2022 | Carter |
| 2022/0236806 A1 | 7/2022 | Carter |
| 2022/0252550 A1 | 8/2022 | Catsis |
| 2022/0300028 A1 | 9/2022 | Long |
| 2022/0300070 A1 | 9/2022 | Iodice |
| 2022/0329250 A1 | 10/2022 | Long |
| 2022/0393095 A1 | 12/2022 | Chilles |
| 2023/0036123 A1 | 2/2023 | Long |
| 2023/0075917 A1 | 3/2023 | Pittera |
| 2023/0087395 A1 | 3/2023 | Borar |
| 2023/0117919 A1 | 4/2023 | Michele |
| 2023/0124704 A1 | 4/2023 | Rorke |
| 2023/0141896 A1 | 5/2023 | Liu |
| 2023/0168228 A1 | 6/2023 | Brian |
| 2023/0215248 A1 | 7/2023 | Lowther |
| 2023/0228857 A1 | 7/2023 | Carter |
| 2023/0251720 A1 | 8/2023 | William |
| 2023/0259213 A1 | 8/2023 | Long |
| 2023/0298444 A1 | 9/2023 | Kappus |
| 2023/0360504 A1 | 11/2023 | Kappus |
| 2023/0368771 A1 | 11/2023 | Kappus |
| 2023/0378966 A1 | 11/2023 | Long |
| 2024/0021072 A1 | 1/2024 | Carter |
| 2024/0036652 A1 | 2/2024 | Yamada |
| 2024/0056655 A1 | 2/2024 | Page |
| 2024/0069640 A1 | 2/2024 | Long |
| 2024/0095953 A1 | 3/2024 | Lyons |
| 2024/0096183 A1 | 3/2024 | Carter |
| 2024/0129655 A1 | 4/2024 | Chilles |
| 2024/0135789 A1 | 4/2024 | Long |
| 2024/0157399 A1 | 5/2024 | Buckland |
| 2024/0265907 A1 | 8/2024 | Long |
| 2024/0288945 A1 | 8/2024 | Long |
| 2024/0296825 A1 | 9/2024 | Long |
| 2024/0402809 A1 | 12/2024 | Kappus |
| 2024/0402996 A1 | 12/2024 | Long |
| 2024/0411374 A1 | 12/2024 | Wren |

FOREIGN PATENT DOCUMENTS

| | | |
|---|---|---|
| CN | 101986787 | 3/2011 |
| CN | 102459900 | 5/2012 |
| CN | 102591512 | 7/2012 |
| CN | 103797379 | 5/2014 |
| CN | 103984414 A | 8/2014 |
| CN | 107340871 A | 11/2017 |
| CN | 107407969 A | 11/2017 |
| CN | 107534810 A | 1/2018 |
| CN | 108780642 A | 11/2018 |

(56) References Cited

FOREIGN PATENT DOCUMENTS

| | | |
|---|---|---|
| CN | 116034422 A | 4/2023 |
| EP | 0057594 A2 | 8/1982 |
| EP | 309003 | 3/1989 |
| EP | 0696670 A1 | 2/1996 |
| EP | 1875081 A1 | 1/2008 |
| EP | 1911530 | 4/2008 |
| EP | 2271129 A1 | 1/2011 |
| EP | 1461598 B1 | 4/2014 |
| EP | 3207817 A1 | 8/2017 |
| EP | 3216231 B1 | 8/2019 |
| EP | 3916525 | 12/2021 |
| GB | 2464117 | 4/2010 |
| GB | 2513884 | 11/2014 |
| GB | 2513884 A | 11/2014 |
| GB | 2530036 | 3/2016 |
| JP | 2008074075 | 4/2008 |
| JP | 2010109579 | 5/2010 |
| JP | 2011172074 | 9/2011 |
| JP | 2012048378 | 3/2012 |
| JP | 2012048378 A | 3/2012 |
| JP | 5477736 B2 | 4/2014 |
| JP | 2015035657 A | 2/2015 |
| JP | 2016035646 | 3/2016 |
| JP | 2017168086 | 9/2017 |
| JP | 6239796 | 11/2017 |
| KR | 20120065779 | 6/2012 |
| KR | 20130055972 | 5/2013 |
| KR | 1020130055972 | 5/2013 |
| KR | 20160008280 | 1/2016 |
| KR | 20200082449 A | 7/2020 |
| TW | 201308837 | 2/2013 |
| WO | 9118486 | 11/1991 |
| WO | 9639754 | 12/1996 |
| WO | 03050511 A | 6/2003 |
| WO | 2005017965 | 2/2005 |
| WO | 2007144801 A2 | 12/2007 |
| WO | 2009071746 A1 | 6/2009 |
| WO | 2009112866 | 9/2009 |
| WO | 2010003836 | 1/2010 |
| WO | 2010139916 | 12/2010 |
| WO | 2011132012 A1 | 10/2011 |
| WO | 2012023864 | 2/2012 |
| WO | 2012104648 A1 | 8/2012 |
| WO | 2013179179 | 12/2013 |
| WO | 2014181084 | 11/2014 |
| WO | 2014181084 A1 | 11/2014 |
| WO | 2015006467 | 1/2015 |
| WO | 2015039622 | 3/2015 |
| WO | 2015127335 | 8/2015 |
| WO | 2015194510 | 12/2015 |
| WO | 2016007920 | 1/2016 |
| WO | 2016073936 | 5/2016 |
| WO | 2016095033 A1 | 6/2016 |
| WO | 2016099279 | 6/2016 |
| WO | 2016132141 | 8/2016 |
| WO | 2016132144 | 8/2016 |
| WO | 2016137675 | 9/2016 |
| WO | 2016162058 | 10/2016 |
| WO | 2016171651 | 10/2016 |
| WO | 2017172006 | 10/2017 |
| WO | WO-2018000731 A1 * 1/2018 ............... G06K 9/62 | |
| WO | 2018109466 A1 | 6/2018 |
| WO | 2018168562 A1 | 9/2018 |
| WO | 2019190894 | 10/2019 |
| WO | 2020049321 A2 | 3/2020 |
| WO | 2021130505 A1 | 7/2021 |
| WO | 2021260373 A1 | 12/2021 |
| WO | 2021262343 | 12/2021 |

OTHER PUBLICATIONS

Iwamoto et al. (2008), Non-contact Method for Producing Tactile Sensation Using Airborne Ultrasound, EuroHaptics, pp. 504-513.

Iwamoto et al., Airborne Ultrasound Tactile Display: Supplement, The University of Tokyo 2008 (2 pages).

Iwamoto T et al, "Two-dimensional Scanning Tactile Display using Ultrasound Radiation Pressure", Haptic Interfaces for Virtual Environment and Teleoperator Systems, 2006 14TH Symposium on Alexandria, VA, USA Mar. 25-26, 2006, Piscataway, NJ, USA, IEEE, (Mar. 25, 2006), ISBN 978-1-4244-0226-7, pp. 57-61.

Jager et al., "Air-Coupled 40-KHZ Ultrasonic 2D-Phased Array Based on a 3D-Printed Waveguide Structure", 2017 IEEE, 4 pages.

Japanese Office Action (with English language translation) for Application No. 2017-514569, dated Mar. 31, 2019, 10 pages.

JonasChatel-Goldman, Touch increases autonomic coupling between romantic partners, Frontiers in Behavioral Neuroscience Mar. 2014, vol. 8, Article 95.

Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.

Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.

Jonathan Tompson et al., Real-Time Continuous Pose Recovery of Human Hands Using Convolutional Networks, ACM Trans. Graph. 33, 5, Article 169, Aug. 2014, pp. 1-10.

K. Jia, Dynamic properties of micro-particles in ultrasonic transportation using phase-controlled standing waves, J. Applied Physics 116, n. 16 (2014) (12 pages).

Kai Tsumoto, Presentation of Tactile Pleasantness Using Airborne Ultrasound, 2021 IEEE World Haptics Conference (WHC) Jul. 6-9, 2021. Montreal, Canada.

Kaiming He et al., Deep Residual Learning for Image Recognition, http://image-net.org/challenges/LSVRC/2015/ and http://mscoco.org/dataset/#detections-challenge2015, Dec. 10, 2015, pp. 1-12.

Kamakura, T. and Aoki, K. (2006) "A Highly Directional Audio System using a Parametric Array in Air" WESPAC IX 2006 (8 pages).

Keisuke Hasegawa, Electronically steerable ultrasound-driven long narrow air stream, Applied Physics Letters 111, 064104 (2017).

Keisuke Hasegawa, Midair Ultrasound Fragrance Rendering, IEEE Transactions on Visualization and Computer Graphics, vol. 24, No. 4, Apr. 2018 1477.

Keisuke Hasegawa,, Curved acceleration path of ultrasound-driven air flow, J. Appl. Phys. 125, 054902 (2019).

Kolb, et al., "Time-of-Flight Cameras in Computer Graphics," Computer Graphics forum, vol. 29 (2010), No. 1, pp. 141-159.

Konstantinos Bousmalis et al., Domain Separation Networks, 29th Conference on Neural Information Processing Sysgtems (NIPS 2016), Barcelona, Spain. Aug. 22, 2016, pp. 1-15.

Krim, et al., "Two Decades of Array Signal Processing Research—The Parametric Approach", IEEE Signal Processing Magazine, Jul. 1996, pp. 67-94.

Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.

Large et al.,Feel the noise: Mid-air ultrasound haptics as a novel human-vehicle Interaction paradigm, Applied Ergonomics (2019) (10 pages).

Li, Larry, "Time-of-Flight Camera—An Introduction," Texas Instruments, Technical White Paper, SLOA190B—Jan. 2014 Revised May 2014, 10 pages.

Light, E.D., Progress in Two Dimensional Arrays for Real Time Volumetric Imaging, 1998 (17 pages).

Line S Loken, Coding of pleasant touch by unmyelinated afferents in humans, Nature Neuroscience vol. 12 [ No. 5 [ May 2009 547.

Long et al. "Rendering Volumetric Haptic Shapes in Mid-Air using Ultrasound", Dept. of Computer Science, Univ. of Bristol, UK, ACM Transaction on Graphics, vol. 33, No. 6, Article 181, pp. 1-10, November (Year: 2014).

M. Barmatz et al., "Acoustic radiation potential on a sphere in plane, cylindrical, and spherical standing wave fields", The Journal of the Acoustical Society of America, New York, NY, US, (19850301), vol. 77, No. 3, pp. 928-945, XP055389249.

(56) References Cited

OTHER PUBLICATIONS

M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).
Mahboob, "Artificial neural networks for learning inverse kinematics of humanoid robot arms." MS Thesis, 2015. (Year: 2015).
Mahdi Rad et al., Feature Mapping for Learning Fast and Accurate 3D Pose Inference from Synthetic Images, Mar. 26, 2018, pp. 1-14.
Marco a B Andrade et al., "Matrix method for acoustic levitation simulation", IEEE Transactions on Ultrasonics, Ferroelectrics and Frequency Control, IEEE, US, (Aug. 1, 2011), vol. 58, No. 8, ISSN 0885-3010, pp. 1674-1683.
Mariana von Mohr, The soothing function of touch: affective touch reduces feelings of social exclusion, Scientific Reports, 7: 13516, Oct. 18, 2017.
Marin, About LibHand, LibHand-A Hand Articulation Library, www.libhand.org/index.html, Mar. 26, 2020, pp. 1-2; www.ibhand.org/download.html, 1 page; www.libhand.org/examples.html, pp. 1-2.
Markus Oberweger et al., DeepPrior++: Improving Fast and Accurate 3D Hand Pose Estimation, Aug. 28, 2017, pp. 1-10.
Markus Oberweger et al., Hands Deep in Deep Learning for Hand Pose Estimation, Dec. 2, 2016, pp. 1-10.
Marshall, M., Carter, T., Alexander, J., & Subramanian, S. (2012). Ultratangibles: creating movable tangible objects on Interactive tables. In Proceedings of the 2012 ACM annual conference on Human Factors in Computing Systems, (pp. 2185-2188).
Marzo et al., Holographic acoustic elements for manipulation of levitated objects, Nature Communications DOI:I0.1038/ncomms9661 (2015) (7 pages).
Meijster, A., et al., "A General Algorithm for Computing Distance Transforms in Linear Time," Mathematical Morphology and its Applications to Image and Signal Processing, 2002, pp. 331-340.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
Mitsuru Nakajima, Remotely Displaying Cooling Sensation via Ultrasound-Driven Air Flow, Haptics Symposium 2018, San Francisco, USA p. 340.
Mohamed Yacine Tsalamlal, Affective Communication through Air Jet Stimulation: Evidence from Event-Related Potentials, International Journal of Human-Computer Interaction 2018.
Mohamed Yacine Tsalamlal, Non-Intrusive Haptic Interfaces: State-of-the Art Survey, HAID 2013, LNCS 7989, pp. 1-9, 2013.
Mueller, GANerated Hands for Real-Time 3D Hand Tracking from Monocular RGB, Eye in-Painting with Exemplar Generative Adverserial Networks, pp. 49-59 (Jun. 1, 2018).
Nina Gaissert, Christian Wallraven, and Heinrich H. Bulthoff, "Visual and Haptic Perceptual Spaces Show High Similarity in Humans ", published to Journal of Vision in 2010, available at http://www.journalofvision.org/content/10/11/2 and retrieved on Apr. 22, 2020 ( Year: 2010), 20 pages.
Notice of Allowance dated Apr. 20, 2021 for U.S. Appl. No. 16/563,608 (pp. 1-5).
Notice of Allowance dated Apr. 22, 2020 for U.S. Appl. No. 15/671,107 (pp. 1-5).
Notice of Allowance dated Dec. 19, 2018 for U.S. Appl. No. 15/665,629 (pp. 1-9).
Notice of Allowance dated Dec. 21, 2018 for U.S. Appl. No. 15/983,864 (pp. 1-7).
Notice of Allowance dated Feb. 10, 2020, for U.S. Appl. No. 16/160,862 (pp. 1-9).
Notice of Allowance dated Feb. 7, 2019 for U.S. Appl. No. 15/851,214 (pp. 1-7).
Office Action (Notice of Allowance and Fees Due (PTOL-85)) dated Oct. 31, 2022 for U.S. Appl. No. 17/068,834 (pp. 1-2).
Office Action (Notice of Allowance and Fees Due (PTOL-85) dated Oct. 31, 2022 for U.S. Appl. No. 17/176,899 (pp. 1-2).
Office Action (Notice of Allowance and Fees Due (PTOL-85)) dated Nov. 1, 2022 for U.S. Appl. No. 16/404,660 (pp. 1-5).
Office Action (Notice of Allowance and Fees Due (PTOL-85)) dated Nov. 2, 2022 for U.S. Appl. No. 16/734,479 (pp. 1-2).
Office Action (Notice of Allowance and Fees Due (PTOL-85)) dated Nov. 10, 2022 for U.S. Appl. No. 16/198,959 (pp. 1-2).
Office Action (Notice of Allowance and Fees Due (PTOL-85)) dated Nov. 16, 2022 for U.S. Appl. No. 16/404,660 (pp. 1-2).
Office Action (Notice of Allowance and Fees Due (PTOL-85)) dated Dec. 14, 2021 for U.S. Appl. No. 17/170,841 (pp. 1-8).
Office Action dated Apr. 8, 2020, for U.S. Appl. No. 16/198,959 (pp. 1-17).
Office Action dated Apr. 16, 2020 for U.S. Appl. No. 15/839,184 (pp. 1-8).
Office Action dated Apr. 17, 2020 for US App. No. 16/401, 148 (pp. 1-15).
Office Action dated Apr. 18, 2019 for US App. No. 16/296, 127 (pags 1-6).
Office Action dated Apr. 28, 2020 for U.S. Appl. No. 15/396,851 (pp. 1-12).
Office Action dated Apr. 29, 2020 for U.S. Appl. No. 16/374,301 (pp. 1-18).
Office Action dated Apr. 4, 2019 for U.S. Appl. No. 15/897,804 (pp. 1-10).
Office Action dated Aug. 10, 2021 for U.S. Appl. No. 16/564,016 (pp. 1-14).
Office Action dated Aug. 19, 2021 for U.S. Appl. No. 17/170,841 (pp. 1-9).
Office Action dated Aug. 22, 2019 for U.S. Appl. No. 16/160,862 (pp. 1-5).
Office Action dated Aug. 9, 2021 for U.S. Appl. No. 17/068,825 (pp. 1-9).
Office Action dated Dec. 11, 2019 for U.S. Appl. No. 15/959,266 (pp. 1-15).
Office Action dated Dec. 7, 2020 for U.S. Appl. No. 16/563,608 (pp. 1-8).
Office Action dated Feb. 20, 2019 for U.S. Appl. No. 15/623,516 (pp. 1-8).
Office Action dated Feb. 25, 2020 for US App. No. 15/960, 113 (pp. 1-7).
Office Action dated Feb. 7, 2020 for U.S. Appl. No. 16/159,695 (pp. 1-8).
Office Action dated Jan. 10, 2020 for U.S. Appl. No. 16/228,767 (pp. 1-6).
Office Action dated Jan. 29, 2020 for U.S. Appl. No. 16/198,959 (p. 1-6).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
Office Action dated Jul. 9, 2020 for U.S. Appl. No. 16/228,760 (pp. 1-17).
Office Action dated Jun. 19, 2020 for U.S. Appl. No. 16/699,629 (pp. 1-12).
Office Action dated Jun. 25, 2020 for U.S. Appl. No. 16/228,767 (pp. 1-27).
Office Action dated Jun. 25, 2021 for U.S. Appl. No. 16/899,720 (pp. 1-5).
Office Action dated Mar. 11, 2021 for U.S. Appl. No. 16/228,767 (pp. 1-23).
Office Action dated Mar. 20, 2020 for U.S. Appl. No. 15/210,661 (pp. 1-10).
Office Action dated Mar. 31, 2021 for U.S. Appl. No. 16/228,760 (pp. 1-21).
Office Action dated May 13, 2021 for U.S. Appl. No. 16/600,500 (pp. 1-9).
Office Action dated May 14, 2021 for U.S. Appl. No. 16/198,959 (pp. 1-6).
Office Action dated May 16, 2019 for U.S. Appl. No. 15/396,851 (pp. 1-7).
Office Action dated May 18, 2020 for US App. No. 15/960, 113 (pp. 1-21).
Office Action dated Oct. 17, 2019 for U.S. Appl. No. 15/897,804 (pp. 1-10).

(56) References Cited

OTHER PUBLICATIONS

Office Action dated Oct. 29, 2021 for U.S. Appl. No. 16/198,959 (pp. 1-7).
Office Action dated Oct. 31, 2019 for US App. No. 15/671, 107 (pp. 1-6).
Office Action dated Oct. 7, 2019 for U.S. Appl. No. 15/396,851 (pp. 1-9).
Office Action dated Sep. 16, 2021 for U.S. Appl. No. 16/600,496 (pp. 1-8).
Office Action dated Sep. 18, 2020 for U.S. Appl. No. 15/396,851 (pp. 1-14).
Office Action dated Sep. 21, 2020 for U.S. Appl. No. 16/198,959 (pp. 1-17).
Office Action dated Sep. 24, 2021 for U.S. Appl. No. 17/080,840 (pp. 1-9).
OGRECave/ogre—GitHub: ogre/Samples/Media/materials at 7de80a7483f20b50f2b10d7ac6de9d9c6c87d364, Mar. 26, 2020, 1 page.
Dikonomidis et al., "Efficient model-based 3D tracking of hand articulations using Kinect." In BmVC, vol. 1, No. 2, p. 3. 2011. (Year: 2011).
Optimal regularisation for acoustic source reconstruction by inverse methods, Y. Kim, P.A. Nelson, Institute of Sound and Vibration Research, University of Southampton, Southampton, SO17 1BJ, UK Received Feb. 25, 2003; 25 pages.
Oscar Martinez-Graullera et al., "2D array design based on Fermat spiral for ultrasound imaging", ULTRASONICS, (Feb. 1, 2010), vol. 50, No. 2, ISSN 0041-624X, pp. 280-289, XP055210119.
Uta Sailer, How Sensory and Affective Attributes Describe Touch Targeting C-Tactile Fibers, Experimental Psychology (2020), 67(4), 224-236.
Vincent Lepetit et al., Model Based Augmentation and Testing of an Annotated Hand Pose Dataset, ResearchGate, https://www.researchgate.net/publication/307910344, Sep. 2016, 13 pages.
Walter, S., Nieweglowski, K., Rebenklau, L., Wolter, K. J., Lamek, B., Schubert, F., . . . & Meyendorf, N. (2008, May). Manufacturing and electrical interconnection of piezoelectric 1-3 composite materials for phased array ultrasonic transducers. In 2008 31st International Spring Seminar on Electronics Technology (pp. 255-260).
Wang et al., Few-shot adaptive faster r-cnn.' In Proceedings of the IEEE/CVF Conference on Computer Vision and Pattern Recognition, pp. 7173-7182. 2019. (Year: 2019).
Wang et al., Device-Free Gesture Tracking Using Acoustic Signals, ACM MobiCom '16, pp. 82-94 (13 pages).
Wilson et al., Perception of Ultrasonic Haptic Feedback on the Hand: Localisation and Apparent Motion, CHI 2014, Apr. 26-May 1, 2014, Toronto, Ontario, Canada. (10 pages).
Wooh et al., "Optimum beam steering of linear phased arays," Wave Motion 29 (1999) pp. 245-265, 21 pages.
Xin Cheng et al., "Computation of the acoustic radiation force on a sphere based on the 3-D Fdtd method", Piezoelectricity, Acoustic Waves and Device Applications (SPAWDA), 2010 Symposium on, IEEE, (Dec. 10, 2010), ISBN 978-1-4244-9822-2, pp. 236-239.
Ku Hongyi et al., "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Yang Ling et al., "Phase-coded approach for controllable generation of acoustical vortices", Journal of Applied Physics, American Institute of Physics, US, vol. 113, No. 15, ISSN 0021-8979, (20130421), pp. 154904-154904.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, NY, USA, 2016, JMLR: W&CP vol. 48.
Yaroslav Ganin et al., Domain-Adversarial Training of Neural Networks, Journal of Machine Learning Research 17 (2016) 1-35, submitted 5/15; published 4/16.
Yaroslav Ganin et al., Unsupervised Domain Adaptataion by Backpropagation, Skolkovo Institute of Science and Technology (Skoltech), Moscow Region, Russia, Proceedings of the 32nd International Conference on Machine Learning, Lille, France, 2015, JMLR: W&CP vol. 37, copyright 2015 by the author(s), 11 pages.
Yoshino, K. and Shinoda, H. (2013), "Visio Acoustic Screen for Contactless Touch Interface with Tactile Sensation", University of Tokyo (5 pages).
Zeng, Wejun, "Microsoft Kinect Sensor and Its Effect," IEEE Multimedia, Apr.-Jun. 2012, 7 pages.
EPO Office Action for EP16708440.9 dated Sep. 12, 2018 (7 pages).
EPSRC Grant summary EP/J004448/1 (2011) (1 page).
Eric Tzeng et al., Adversarial Discriminative Domain Adaptation, Feb. 17, 2017, pp. 1-10.
European Office Action for Application No. EP16750992.6, dated Oct. 2, 2019, 3 pages.
Ex Parte Quayle Action dated Dec. 28, 2018 for U.S. Appl. No. 15/966,213 (pp. 1-7).
Extended European Search Report for Application No. EP19169929.7, dated Aug. 6, 2019, 7 pages.
Freeman et al., Tactile Feedback for Above-Device Gesture Interfaces: Adding Touch to Touchless Interactions CMI'14, Nov. 12-16, 2014, Istanbul, Turkey (8 pages).
Gareth Young et al.. Designing Mid-Air Haptic Gesture Controlled User Interfaces for Cars, PACM on Human-Computer Interactions, Jun. 2020 (24 pages).
Gavrilov L R et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Georgiou et al., Haptic In-Vehicle Gesture Controls, Adjunct Proceedings of the 9th International ACM Conference on Automotive User Interfaces and Interactive Vehicular Applications (AutomotiveUI '17), Sep. 24-27, 2017 (6 pages).
GitHub—danfis/libccd: Library for collision detection between two convex shapes, Mar. 26, 2020, pp. 1-6.
GitHub—IntelRealSense/hand_tracking_samples: researc codebase for depth-based hand pose estimation using dynamics based tracking and CNNs, Mar. 26, 2020, 3 pages.
Gokturk, et al., "A Time-of-Flight Depth Sensor-System Description, Issues and Solutions," Published in: 2004 Conference on Computer Vision and Pattern Recognition Workshop, Date of Conference: Jul. 27-Jul. 2, 2004, 9 pages.
Guez, "Solution to the inverse kinematic problem in robotics by neural networks." In Proceedings of the 2nd International Conference on Neural Networks, 1988. San Diego, California. (Year: 1988).
Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Henneberg, J., Gerlach, A., Storck, H., Cebulla, H., & Marburg, S. (2018). Reducing mechanical cross-coupling in phased array transducers using stop band material as backing. Journal of Sound and Vibration, 424, 352-364.
Henrik Bruus, Acoustofluidics 2: Perturbation theory and ultrasound resonance modes, Lab Chip, 2012, 12, 20-28.
Hilleges et al. Interactions in the air: adding further depth to interactive tabletops, UIST '09: Proceedings of the 22nd annual ACM symposium on User interface software and technology Oct. 2009 pp. 139-148.
Hoshi et al., Tactile Presentation by Airborne Ultrasonic Oscillator Array, Proceedings of Robotics and Mechatronics Lecture 2009, Japan Society of Mechanical Engineers; May 24, 2009 (5 pages).
Hoshi T et al, "Noncontact Tactile Display Based on Radiation Pressure of Airborne Ultrasound", IEEE Transactions on Haptics, IEEE, USA, (Jul. 1, 2010), vol. 3, No. 3, ISSN 1939-1412, pp. 155-165.
Hoshi, T., Development of Aerial-Input and Aerial-Tactile-Feedback System, IEEE World Haptics Conference 2011, p. 569-573.

(56) References Cited

OTHER PUBLICATIONS

Hoshi, T., Handwriting Transmission System Using Noncontact Tactile Display, IEEE Haptics Symposium 2012 pp. 399-401.
Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Hoshi, T., Touchable Holography, SIGGRAPH 2009, New Orleans, Louisiana, Aug. 3-7, 2009. (1 page).
https://radiopaedia.org/articles/physical-principles-of-ultrasound-1?lang=GB (Accessed May 29, 2022).
Hua J, Qin H., Haptics-based dynamic implicit solid modeling, IEEE Trans Vis Comput Graph. Sep.-Oct. 2004;10(5):574-86.
Hyunjae Gil, Whiskers: Exploring the Use of Ultrasonic Haptic Cues on the Face, CHI 2018, Apr. 21-26, 2018, Montréal, QC, Canada.
Iddan, et al., "3D Imaging in the Studio (And Elsewhwere . . . " Apr. 2001, 3DV systems Ltd., Yokneam, Isreal, www.3dvsystems.com.il, 9 pages.
Imaginary Phone: Learning Imaginary Interfaces by Transferring Spatial Memory From a Familiar Device Sean Gustafson, Christian Holz and Patrick Baudisch. UIST 2011. (10 pages).
IN 202047026493 Office Action dated Mar. 8, 2022, 6 pages.
India Morrison, The skin as a social organ, Exp Brain Res (2010) 204:305-314.
International Preliminary Report on Patentability and Written Opinion issued in corresponding PCT/US2017/035009, dated Dec. 4, 2018, 8 pages.
International Preliminary Report on Patentability for Application No. PCT/EP2017/069569 dated Feb. 5, 2019, 11 bages.
International Search Report and Written Opinion for App. No. PCT/GB2021/051590, dated Nov. 11, 2021, 20 pages.
International Search Report and Written Opinion for Application No. PCT/GB2018/053738, date of mailing Apr. 11, 2019, 14 pages.
International Search Report and Written Opinion for Application No. PCT/GB2018/053739, date of mailing Jun. 4, 2019, 16 pages.
International Search Report and Written Opinion for Application No. PCT/GB2019/050969, date of mailing Jun. 13, 2019, 15 pages.
International Search Report and Written Opinion for Application No. PCT/GB2019/051223, date of mailing Aug. 8, 2019, 15 pages.
International Search Report and Written Opinion for Application No. PCT/GB2019/052510, date of mailing Jan. 14, 2020, 25 pages.
Invitatioin to Pay Additional Fees for PCT/GB2022/051821 (Oct. 20, 2022).
ISR & WO for PCT/GB2020/052545 (Jan. 27, 2021) 14 pages.
ISR & WO For PCT/GB2021/052946, 15 pages.
ISR & WO for PCT/GB2022/051388 (Aug. 30, 2022) (15 pages).
ISR and WO for PCT/GB2020/050013 (Jul. 13, 2020) (20 pages).
ISR and WO for PCT/GB2020/050926 (Jun. 2, 2020) (16 pages).
ISR and WO for PCT/GB2020/052544 (Dec. 18, 2020) (14 pages).
ISR and WO for PCT/GB2020/052829 (Feb. 10, 2021) (15 pages).
ISR and WO for PCT/GB2021/052415 (Dec. 22, 2021) (16 pages).
ISR for PCT/GB2020/052546 (Feb. 23, 2021) (14 pages).
"Welcome to Project Soli" video, https://atap.google.com/#project-soli Accessed Nov. 30, 2018, 2 pages.
A. B. Vallbo, Receptive field characteristics of tactile units with myelinated afferents in hairy skin of human subjects, Journal of Physiology (1995), 483.3, pp. 783-795.
A. Sand, Head-Mounted Display with Mid-Air Tactile Feedback, Proceedings of the 21st ACM Symposium on Virtual Reality Software and Technology, Nov. 13-15, 2015 (8 pages).
Al-Mashhadany, "Inverse Kinematics Problem (IKP) of 6-DOF Manipulator By Locally Recurrent Neural Networks (LRNNs)," Management and Service Science (MASS), International Conference on Management and Service Science., IEEE, Aug. 24, 2010, 5 pages. (Year: 2010).
Alexander, J. et al. (2011), Adding Haptic Feedback to Mobile TV (6 pages).

Almusawi et al., "A new artificial neural network approach in solving inverse kinematics of robotic arm (denso vp6242)." Computational intelligence and neuroscience 2016 (2016). (Year: 2016).
Amanda Zimmerman, The gentle touch receptors of mammalian skin, Science, Nov. 21, 2014, vol. 346 Issue 6212, p. 950.
Anonymous: "How does Ultrahaptics technology work?—Ultrahaptics Developer Information", Jul. 31, 2018 (Jul. 31, 2018), XP055839320, Retrieved from the Internet: URL:https://developer.ultrahaptics.com/knowledgebase/haptics-overview/ [retrieved on Sep. 8, 2021].
Aoki et al., Sound location of stero reproduction with parametric loudspeakers, Applied Acoustics 73 (2012) 1289-1295 (7 pages).
Ashish Shrivastava et al., Learning from Simulated and Unsupervised Images through Adversarial Training, Jul. 19, 2017, pp. 1-16.
Azad et al., "Deep domain adaptation under deep label scarcity." arXiv preprint arXiv:1809.08097 (2018) (Year: 2018).
Bajard et al., BKM: A New Hardware Algorithm for Complex Elementary Functions, 8092 IEEE Transactions on Computers 43 (1994) (9 pages).
Bajard et al., Evaluation of Complex Elementary Functions / A New Version of BKM, SPIE Conference on Advanced Signal Processing, Jul. 1999 (8 pages).
Benjamin Long et al., "Rendering volumetric haptic shapes in mid-air using ultrasound", ACM Transactions on Graphics (TOG), ACM, US, (Nov. 19, 2014), vol. 33, No. 6, ISSN 0730-0301, pp. 1-10.
Beranek, L., & Mellow, T. (2019). Acoustics: Sound Fields, Transducers and Vibration. Academic Press.
Bortoff et al., Pseudolinearization of the Acrobot using Spline Functions, IEEE Proceedings of the 31st Conference on Decision and Control, Sep. 10, 1992 (6 pages).
Boureau et al., "A theoretical analysis of feature pooling in visual recognition." In Proceedings of the 27th international conference on machine learning (ICML-10), pp. 111-118. 2010. (Year: 2010).
Bożena Smagowska & Małgorzata Pawlaczyk-Łuszczyńska (2013) Effects of Ultrasonic Noise on the Human Body—A Bibliographic Review, International Journal of Occupational Safety and Ergonomics, 19:2, 195-202.
Brian Kappus and Ben Long, Spatiotemporal Modulation for Mid-Air Haptic Feedback from an Ultrasonic Phased Array, ICSV25, Hiroshima, Jul. 8-12, 2018, 6 pages.
Bybi, A., Grondel, S., Mzerd, A., Granger, C., Garoum, M., & Assaad, J. (2019). Investigation of cross-coupling in piezoelectric transducer arrays and correction. International Journal of Engineering and Technology Innovation, 9(4), 287.
Canada Application 2,909,804 Office Action dated Oct. 18, 2019, 4 pages.
Casper et al., Realtime Control of Multiple-focus Phased Array Heating Patterns Based on Noninvasive Ultrasound Thermography, IEEE Trans Biomed Eng. Jan. 2012; 59(1): 95-105.
Certon, D., Felix, N., Hue, P. T. H., Patat, F., & Lethiecq, M. (Oct. 1999). Evaluation of laser probe performances for measuring cross-coupling in 1-3 piezocomposite arrays. In 1999 IEEE Ultrasonics Symposium. Proceedings. International Symposium (Cat. No. 99CH37027) (vol. 2, pp. 1091-1094).
Certon, D., Felix, N., Lacaze, E., Teston, F., & Patat, F. (2001). Investigation of cross-coupling in 1-3 piezocomposite arrays. IEEE transactions on ultrasonics, ferroelectrics, and frequency control, 48(1), 85-92.
Chang Suk Lee et al., An electrically switchable visible to infra-red dual frequency cholesteric liquid crystal light shutter. J. Mater. Chem. C, 2018, 6, 4243 (7 pages).
Christoper M. Bishop, Pattern Recognition and Machine Learning, 2006, pp. 1-758.
Colgan, A., "How Does the Leap Motion Controller Work?" Leap Motion, Aug. 9, 2014, 10 pages.
Communication Pursuant to Article 94(3) EPC for EP 19723179.8 (Feb. 15, 2022), 10 pages.
Corrected Notice of Allowability dated Aug. 9, 2021 for U.S. Appl. No. 15/396,851 (pp. 1-6).
Corrected Notice of Allowability dated Jan. 14, 2021 for U.S. Appl. No. 15/897,804 (pp. 1-2).

(56) References Cited

OTHER PUBLICATIONS

Corrected Notice of Allowability dated Jun. 21, 2019 for U.S. Appl. No. 15/966,213 (2 pages).
Corrected Notice of Allowability dated Nov. 24, 2021 for U.S. Appl. No. 16/600,500 (pp. 1-5).
Corrected Notice of Allowability dated Oct. 31, 2019 for U.S. Appl. No. 15/623,516 (pp. 1-2).
Damn Geeky, "Virtual projection keyboard technology with haptic feedback on palm of your hand," May 30, 2013, 4 pages.
David Joseph Tan et al., Fits like a Glove: Rapid and Reliable Hand Shape Personalization, 2016 IEEE Conference on Computer Vision and Pattern Recognition, pp. 5610-5619.
Definition of "Interferometry"according to Wikipedia, 25 pages., Retrieved Nov. 2018.
Definition of "Multilateration" according to Wikipedia, 7 pages., Retrieved Nov. 2018.
Definition of "Trilateration"according to Wikipedia, 2 pages., Retrieved Nov. 2018.
Der et al., "Inverse kinematics for reduced deformable models." ACM Transactions on graphics (TOG) 25, No. 3 (2006):1174-1179. (Year: 2006).
Desilets, C. S. (1978). Transducer arrays suitable for acoustic imaging (No. GL-2833). Stanford Univ CA Edward L Ginzton Lab of Physics.
Diederik P. Kingma et al., Adam: A Method for Stochastic Optimization, Jan. 30, 2017, pp. 1-15.
Duka, "Neural network based inverse kinematics solution for trajectory tracking of a robotic arm." Procedia Technology 12 (2014) 20-27. (Year: 2014).
E. Bok, Metasurface for Water-to-Air Sound Transmission, Physical Review Letters 120, 044302 (2018) (6 pages).
E.S. Ebbini et al. (1991), A spherical-section ultrasound phased array applicator for deep localized hyperthermia, Biomedical Engineering, IEEE Transactions on (vol. 38 Issue: 7), pp. 634-643.
EPO 21186570.4 Extended Search Report dated Oct. 29, 2021.
EPO Application 18 725 358.8 Examination Report Dated Sep. 22, 2021.
EPO Communication for Application 18 811 906.9 (Nov. 29, 2021) (15 pages).
EPO Examination Report 17 748 4656.4 (Jan. 12, 2021) (16 pages).
EPO Examination Search Report 17 702 910.5 (Jun. 23, 2021).
EPO ISR and WO for PCT/GB2022/050204 (Apr. 7, 2022) (15 pages).
Partial International Search Report for Application No. PCT/GB2018/053735, date of mailing Apr. 12, 2019, 14 pages.
Partial ISR for Application No. PCT/GB2020/050013 dated May 19, 2020 (16 pages).
Patricio Rodrigues, E., Francisco de Oliveira, T., Yassunori Matuda, M., & Buiochi, F. (2019, September). Design and Construction of a 2-D Phased Array Ultrasonic Transducer for Coupling in Water. In INTER-NOISE and NOISE-CON Congress and Conference Proceedings (vol. 259, No. 4, pp. 5720-5731). Institute of Noise Control Engineering.
PCT Partial International Search Report for Application No. PCT/GB2018/053404 date of mailing Feb. 25, 2019, 13 pages.
Péter Tamás Kovács et al., "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Phys.org, Touchable Hologram Becomes Reality, Aug. 6, 2009, by Lisa Zyga (2 pages).
Pompei, F.J. (2002), "Sound from Ultrasound: The Parametric Array as an Audible Sound Source", Massachusetts Institute of Technology (132 pages).
Rocchesso et al., Accessing and Selecting Menu Items by In-Air Touch, ACM CHItaly' 19, Sep. 23-25, 2019, Padova, Italy (9 pages).
Rochelle Ackerley, Human C-Tactile Afferents Are Tuned to the Temperature of a Skin-Stroking Caress, J. Neurosci., Feb. 19, 2014, 34(8):2879-2883.

Ryoko Takahashi, Tactile Stimulation by Repetitive Lateral Movement of Midair Ultrasound Focus, Journal of Latex Class Files, vol. 14, No. 8, Aug. 2015.
Schmidt, Ralph, "Multiple Emitter Location and Signal Parameter Estimation" IEEE Transactions of Antenna and Propagation, vol. AP-34, No. 3, Mar. 1986, pp. 276-280.
Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, DOI: 10.1145/2047196.2047233, ISBN: 978-1-4503-0716-1.
Search report and Written Opinion of ISA for PCT/GB2015/050417 dated Jul. 8, 2016 (20 pages).
Search report and Written Opinion of ISA for PCT/GB2015/050421 dated Jul. 8, 2016 (15 pages).
Search report and Written Opinion of ISA for PCT/GB2017/050012 dated Jun. 8, 2017. (18 pages).
Search Report by EPO for EP 17748466 dated Jan. 13, 2021 (16 pages).
Search Report for GB1308274.8 dated Nov. 11, 2013. (2 pages).
Search Report for GB1415923.0 dated Mar. 11, 2015. (1 page).
Search Report for PCT/GB/2017/053729 dated Mar. 15, 2018 (16 pages).
Search Report for PCT/GB/2017/053880 dated Mar. 21, 2018. (13 pages).
Search report for PCT/GB2014/051319 dated Dec. 8, 2014 (4 pages).
Search report for PCT/GB2015/052507 dated Mar. 11, 2020 (19 pages).
Search report for PCT/GB2015/052578 dated Oct. 26, 2015 (12 pages).
Search report for PCT/GB2015/052916 dated Feb. 26, 2020 (18 pages).
Search Report for PCT/GB2017/052332 dated Oct. 10, 2017 (12 pages).
Search report for PCT/GB2018/051061 dated Sep. 26, 2018 (17 pages).
Search report for PCT/US2018/028966 dated Jul. 13, 2018 (43 pages).
Seo et al., "Improved numerical inverse kinematics for human pose estimation," Opt. Eng. 50(3 037001 (Mar. 1, 2011) https:// doi.org/10.1117/1.3549255 (Year: 2011).
Sergey Ioffe et al., Batch Normalization: Accelerating Deep Network Training by Reducing Internal Covariat Shift, Mar. 2, 2015, pp. 1-11.
Seungryul, Pushing the Envelope for RGB-based Dense 3D Hand Pose Estimation for RGB-based Desne 3D Hand Pose Estimation via Neural Rendering, arXiv:1904.04196v2 [cs.CV] Apr. 9, 2019 (5 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Shanxin Yuan et al., BigHand2.2M Bechmark: Hand Pose Dataset and State of the Art Analysis, Dec. 9, 2017, pp. 1-9.
Shome Subhra Das, Detectioin of Self Intersection in Synthetic Hand Pose Generators, 2017 Fifteenth IAPR International Conference on Machine Vision Applications (MVA), Nagoya University, Nagoya, Japan, May 8-12, 2017, pp. 354-357.
Sixth Sense webpage, http://www.pranavmistry.com/projects/sixthsense/ Accessed Nov. 30, 2018, 7 pages.
Stan Melax et al., Dynamics Based 3D Skeletal Hand Tracking, May 22, 2017, pp. 1-8.
Stanley J. Bolanowski, Hairy Skin: Psychophysical Channels and Their Physiological Substrates, Somatosensory and Motor Research, vol. 11. No. 3, 1994, pp. 279-290.
Stefan G. Lechner, Hairy Sensation, Physiology 28: 142-150, 2013.
Steve Guest et al., "Audiotactile interactions in roughness perception", Exp. Brain Res (2002) 146:161-171, DOI 10.1007/s00221-002-1164-z, Received: Feb. 9, 2002/Accepted: May 16, 2002/Published online: Jul. 26, 2002, Springer- Verlag 2002, (11 pages).

(56) References Cited

OTHER PUBLICATIONS

Supplemental Notice of Allowability dated Jul. 28, 2021 for U.S. Appl. No. 16/563,608 (pp. 1-2).
Supplemental Notice of Allowability dated Jul. 28, 2021 for U.S. Appl. No. 17/092,333 (pp. 1-2).
Sylvia Gebhardt, Ultrasonic Transducer Arrays for Particle Manipulation (date unknown) (2 pages).
Takaaki Kamigaki, Noncontact Thermal and Vibrotactile Display Using Focused Airborne Ultrasound, EuroHaptics 2020, LNCS 12272, pp. 271-278, 2020.
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
Takahashi, M. et al., Large Aperture Airborne Ultrasound Tactile Display Using Distributed Array Units, SICE Annual Conference 2010 p. 359-62.
Takayuki et al., "Noncontact Tactile Display Based on Radiation Pressure of Airborne Ultrasound" IEEE Transactions on Haptics vol. 3, No. 3, p. 165 (2010).
Teixeira, et al., "A brief introduction to Microsoft's Kinect Sensor," Kinect, 26 pages, retrieved Nov. 2018.
Toby Sharp et al., Accurate, Robust, and Flexible Real-time Hand Tracking, CHI '15, Apr. 18-23, 2015, Seoul, Republic of Korea, ACM 978-1-4503-3145-6/15/04, pp. 1-10.
Tom Carter et al., "UltraHaptics: Multi-Point Mid-Air Haptic Feedback for Touch Surfaces", Proceedings of the 26th Annual ACM Symposium on User Interface Software and Technology, UIST '13, New York, New York, USA, (Jan. 1, 2013), ISBN 978-1-45-032268-3, pp. 505-514.
Tom Nelligan and Dan Kass, Intro to Ultrasonic Phased Array (date unknown) (8 pages).
Tomoo Kamakura, Acoustic streaming induced in focused Gaussian beams, J. Acoust. Soc. Am. 97 (5), Pt. 1, May 1995 p. 2740.
Aksel Sveier et al., Pose Estimation with Dual Quaternions and Iterative Closest Point, 2018 Annual American Control Conference (ACC) (8 pages).
JP Office Action for JP 2020-534355 (Dec. 6, 2022) (8 pages).
Ken Wada, Ring Buffer Basics (2013) 6 pages.
Notice of Allowance dated Feb. 23, 2023 for U.S. Appl. No. 18/060,556 (pp. 1-10).
Office Action (Ex Parte Quayle Action) dated Jan. 6, 2023 for U.S. Appl. No. 17/195,795 (pp. 1-6).
Office Action (Final Rejection) dated Jan. 9, 2023 for U.S. Appl. No. 16/144,474 (pp. 1-16).
Office Action (Final Rejection) dated Mar. 21, 2023 for U.S. Appl. No. 16/995,819 (pp. 1-7).
Office Action (Non-Final Rejection) dated Mar. 1, 2023 for U.S. Appl. No. 16/564,016 (pp. 1-10).
Office Action (Non-Final Rejection) dated Mar. 22, 2023 for U.S. Appl. No. 17/354,636 (pp. 1-5).
Office Action (Non-Final Rejection) dated Apr. 19, 2023 for U.S. Appl. No. 18/066,267 (pp. 1-11).
Office Action (Non-Final Rejection) dated Apr. 27, 2023 for U.S. Appl. No. 16/229,091 (pp. 1-5).
Office Action (Non-Final Rejection) dated May 8, 2023 for U.S. Appl. No. 18/065,603 (pp. 1-17).
Office Action (Non-Final Rejection) dated May 10, 2023 for U.S. Appl. No. 17/477,536 (pp. 1-13).
Office Action (Notice of Allowance and Fees Due (PTOL-85)) dated Mar. 8, 2023 for U.S. Appl. No. 17/721,315 (pp. 1-8).
Office Action (Notice of Allowance and Fees Due (PTOL-85) dated Mar. 15, 2023 for U.S. Appl. No. 17/134,505 (pp. 1-5).
Office Action (Notice of Allowance and Fees Due (PTOL-85)) dated Mar. 24, 2023 for U.S. Appl. No. 17/080,840 (pp. 1-8).
Office Action (Notice of Allowance and Fees Due (PTOL-85)) dated Apr. 4, 2023 for U.S. Appl. No. 17/409,783 (pp. 1-5).
Office Action (Notice of Allowance and Fees Due (PTOL-85) dated Apr. 6, 2023 for U.S. Appl. No. 17/807,730 (pp. 1-7).
Office Action (Notice of Allowance and Fees Due (PTOL-85)) dated Apr. 28, 2023 for U.S. Appl. No. 17/195,795 (pp. 1-7).
Office Action (Notice of Allowance and Fees Due (PTOL-85) dated May 12, 2023 for U.S. Appl. No. 16/229,091 (pp. 1-8).
Office Action (Notice of Allowance and Fees Due (PTOL-85)) dated May 24, 2023 for U.S. Appl. No. 16/229,091 (pp. 1-2).
Office Action dated Feb. 9, 2023 for U.S. Appl. No. 18/060,556 (pp. 1-5).
Office Action dated Mar. 3, 2023 for U.S. Appl. No. 18/060,525 (pp. 1-12).
Office Action dated Apr. 19, 2023 for U.S. Appl. No. 18/066,267 (pp. 1-11).
Partial ISR for PCT/GB2023/050001 (Mar. 31, 2023) 13 pages.
Rakkolainen et al., A Survey of Mid-Air Ultrasound Haptics and Its Applications (IEEE Transactions on Haptics), vol. 14, No. 1, 2021, 18 pages.
Notice of Allowance dated Jul. 22, 2021 for U.S. Appl. No. 16/600,500 (pp. 1-9).
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Notice of Allowance dated Jun. 10, 2021 for U.S. Appl. No. 17/092,333 (pp. 1-9).
Notice of Allowance dated Jun. 17, 2020 for U.S. Appl. No. 15/210,661 (pp. 1-9).
Notice of Allowance dated Jun. 25, 2021 for U.S. Appl. No. 15/396,851 (pp. 1-10).
Notice of Allowance dated May 30, 2019 for U.S. Appl. No. 15/966,213 (pp. 1-9).
Notice of Allowance dated Nov. 5, 2021 for U.S. Appl. No. 16/899,720 (pp. 1-9).
Notice of Allowance dated Oct. 1, 2020 for U.S. Appl. No. 15/897,804 (pp. 1-9).
Notice of Allowance dated Oct. 16, 2020 for U.S. Appl. No. 16/159,695 (pp. 1-7).
Notice of Allowance dated Oct. 30, 2020 for U.S. Appl. No. 15/839,184 (pp. 1-9).
Notice of Allowance dated Oct. 6, 2020 for U.S. Appl. No. 16/699,629 (pp. 1-8).
Notice of Allowance dated Sep. 30, 2020 for U.S. Appl. No. 16/401,148 (pp. 1-10).
Notice of Allowance in U.S. Appl. No. 15/210,661 dated Jun. 17, 2020 (22 pages).
Obrist et al., Emotions Mediated Through Mid-Air Haptics, CHI 2015, Apr. 18-23, 2015, Seoul, Republic of Korea. (10 bages).
Obrist et al., Talking about Tactile Experiences, CHI 2013, Apr. 27-May 2, 2013 (10 pages).
Office Action (Final Rejection) dated Mar. 14, 2022 for U.S. Appl. No. 16/564,016 (pp. 1-12).
Office Action (Final Rejection) dated Sep. 16, 2022 for U.S. Appl. No. 16/404,660 (pp. 1-6).
Office Action (Final Rejection) dated Nov. 18, 2022 for U.S. Appl. No. 16/228,767 (pp. 1-27).
Office Action (Final Rejection) dated Nov. 18, 2022 for U.S. Appl. No. 17/068,831 (pp. 1-9).
Office Action (Final Rejection) dated Dec. 8, 2022 for U.S. Appl. No. 16/229,091 (pp. 1-9).
Office Action (Final Rejection) dated Dec. 15, 2022 for U.S. Appl. No. 16/843,281 (pp. 1-25).
Office Action (Non-Final Rejection) dated Jan. 21, 2022 for U.S. Appl. No. 17/068,834 (pp. 1-12).
Office Action (Non-Final Rejection) dated Jan. 24, 2022 for U.S. Appl. No. 16/228,767 (pp. 1-22).
Office Action (Non-Final Rejection) dated Mar. 4, 2022 for U.S. Appl. No. 16/404,660 (pp. 1-5).
Office Action (Non-Final Rejection) dated Mar. 15, 2022 for U.S. Appl. No. 16/144,474 (pp. 1-13).
Office Action (Non-Final Rejection) dated Apr. 1, 2022 for U.S. Appl. No. 16/229,091 (pp. 1-10).
Office Action (Non-Final Rejection) dated May 2, 2022 for U.S. Appl. No. 17/068,831 (pp. 1-10).

(56) References Cited

OTHER PUBLICATIONS

Office Action (Non-Final Rejection) dated May 25, 2022 for U.S. Appl. No. 16/843,281 (pp. 1-28).
Office Action (Non-Final Rejection) dated Jun. 9, 2022 for U.S. Appl. No. 17/080,840 (pp. 1-9).
Office Action (Non-Final Rejection) dated Jun. 27, 2022 for U.S. Appl. No. 16/198,959 (pp. 1-17).
Office Action (Non-Final Rejection) dated Jun. 27, 2022 for U.S. Appl. No. 16/734,479 (pp. 1-13).
Office Action (Non-Final Rejection) dated Aug. 29, 2022 for U.S. Appl. No. 16/995,819 (pp. 1-6).
Office Action (Non-Final Rejection) dated Sep. 21, 2022 for U.S. Appl. No. 17/721,315 (pp. 1-10).
Office Action (Non-Final Rejection) dated Oct. 17, 2022 for U.S. Appl. No. 17/807,730 (pp. 1-8).
Office Action (Non-Final Rejection) dated Nov. 9, 2022 for U.S. Appl. No. 17/454,823 (pp. 1-16).
Office Action (Non-Final Rejection) dated Nov. 16, 2022 for U.S. Appl. No. 17/134,505 (pp. 1-7).
Office Action (Non-Final Rejection) dated Nov. 16, 2022 for U.S. Appl. No. 17/692,852 (pp. 1-4).
Office Action (Non-Final Rejection) dated Dec. 6, 2022 for U.S. Appl. No. 17/409,783 (pp. 1-7).
Office Action (Non-Final Rejection) dated Dec. 20, 2021 for U.S. Appl. No. 17/195,795 (pp. 1-7).
Office Action (Non-Final Rejection) dated Dec. 22, 2022 for U.S. Appl. No. 17/457,663 (pp. 1-20).
Office Action (Notice of Allowance and Fees Due (PTOL-85)) dated Jan. 18, 2022 for U.S. Appl. No. 16/899,720 (pp. 1-2).
Office Action (Notice of Allowance and Fees Due (PTOL-85) dated Feb. 11, 2022 for U.S. Appl. No. 16/228,760 (pp. 1-8).
Office Action (Notice of Allowance and Fees Due (PTOL-85)) dated Feb. 28, 2022 for U.S. Appl. No. 17/068,825 (pp. 1-7).
Office Action (Notice of Allowance and Fees Due (PTOL-85)) dated Mar. 7, 2022 for U.S. Appl. No. 16/600,496 (pp. 1-5).
Office Action (Notice of Allowance and Fees Due (PTOL-85)) dated Aug. 24, 2022 for U.S. Appl. No. 16/198,959 (pp. 1-6).
Office Action (Notice of Allowance and Fees Due (PTOL-85)) dated Aug. 31, 2022 for U.S. Appl. No. 16/198,959 (pp. 1-2).
Office Action (Notice of Allowance and Fees Due (PTOL-85)) dated Sep. 7, 2022 for U.S. Appl. No. 17/068,834 (pp. 1-8).
Office Action (Notice of Allowance and Fees Due (PTOL-85)) dated Sep. 8, 2022 for U.S. Appl. No. 17/176,899 (pp. 1-8).
Office Action (Notice of Allowance and Fees Due (PTOL-85)) dated Sep. 12, 2022 for U.S. Appl. No. 16/734,479 (pp. 1-7).
"Flexible piezoelectric transducer for ultrasonic inspection of non-planar components." Ultrasonics 48.5 (2008): 367-375.
Andre J. Duerinckx, Matched gaussian apodization of pulsed acoustic phased arrays, Ultrasonic Imaging, vol. 2, Issue 4, Oct. 1980, pp. 338-369.
Cappellari et al., "Identifying Electromyography Sensor Placement using Dense Neural Networks." In DATA, pp. 130-141. 2018. ( Year: 2018).
EPO Examination Report for EP19769198.3 (Jul. 11, 2023) 9 pages.
Examination Report for EP 17 826 539.3 (Aug. 2, 2023) (5 pages).
First Examination report for ndian Patent Application No. 202247024128 (Aug. 11, 2023) (6 pages).
IL OA for IL 278402 (Nov. 29, 2023) 4 pages.
Inoue, A Pinchable Aerial Virtual Sphere by Acoustic Ultrasound Stationary Wave, IEEE (Year: 2014) 4 pages.
ISR and WO for PCT/GB2023/050001 (May 24, 2023) (20 pages).
ISR and WO for PCT/GB2023/052122 (Oct. 18, 2023) 13 pages.
ISR and WO for PCT/GB2023/052612 (Mar. 7, 2024) 18 pages.
Montenegro et al., "Neural Network as an Alternative to the Jacobian for Iterative Solution to Inverse Kinematics," 2018 Latin American Robotic Symposium, 2018 Brazilian Symposium on Robotics (SBR) and 2018 Workshop on Robotics in Education (WRE) João Pessoa, Brazil, 2018, pp. 333-338 (Year: 2018).

Nuttall, A. (Feb. 1981). Some windows with very good sidelobe behavior. IEEE Transactions on Acoustics, Speech, and Signal Processing. 8 pages.
Ochiai, Cross-Field Aerial Haptics: Rendering Haptic Feedback in Air with Light and Acoustic Fields, CHI (Year: 2016) 10 pages.
Office Action (Ex Parte Quayle Action) dated Jul. 20, 2023 for U.S. Appl. No. 16/843,281 (pp. 1-15).
Office Action (Ex Parte Quayle Action) dated Sep. 18, 2023 for U.S. Appl. No. 18/066,267 (pp. 1-6).
Office Action (Final Rejection) dated Jul. 25, 2023 for U.S. Appl. No. 17/454,823 (pp. 1-17).
Office Action (Final Rejection) dated Aug. 30, 2023 for U.S. Appl. No. 16/564,016 (pp. 1-15).
Office Action (Non-Final Rejection) dated Jan. 19, 2024 for U.S. Appl. No. 18/305,354 (pp. 1-4).
Office Action (Non-Final Rejection) dated Feb. 1, 2024 for U.S. Appl. No. 17/835,411 (pp. 1-7).
Office Action (Non-Final Rejection) dated Mar. 14, 2024 for U.S. Appl. No. 18/188,584 (pp. 1-5).
Office Action (Non-Final Rejection) dated Mar. 28, 2024 for U.S. Appl. No. 18/359,951 (pp. 1-5).
Office Action (Non-Final Rejection) dated Sep. 7, 2023 for U.S. Appl. No. 16/144,474 (pp. 1-16).
Office Action (Non-Final Rejection) dated Sep. 28, 2023 for U.S. Appl. No. 16/995,819 (pp. 1-8).
Office Action (Non-Final Rejection) dated Oct. 3, 2023 for U.S. Appl. No. 18/303,386 (pp. 1-18).
Office Action (Notice of Allowance and Fees Due (PTOL-85)) dated Jan. 31, 2024 for U.S. Appl. No. 18/352,981 (pp. 1-6).
Office Action (Notice of Allowance and Fees Due (PTOL-85)) dated Jun. 16, 2023 for U.S. Appl. No. 17/354,636 (pp. 1-7).
Office Action (Notice of Allowance and Fees Due (PTOL-85)) dated Jul. 20, 2023 for U.S. Appl. No. 17/692,852 (pp. 1-8).
Office Action (Notice of Allowance and Fees Due (PTOL-85)) dated Aug. 2, 2023 for U.S. Appl. No. 16/843,281 (pp. 1-5).
Office Action (Notice of Allowance and Fees Due (PTOL-85)) dated Aug. 8, 2023 for U.S. Appl. No. 17/645,305 (pp. 1-8).
Office Action (Notice of Allowance and Fees Due (PTOL-85)) dated Sep. 11, 2023 for U.S. Appl. No. 18/065,603 (pp. 1-11).
Office Action (Notice of Allowance and Fees Due (PTOL-85)) dated Oct. 12, 2023 for U.S. Appl. No. 18/066,267 (pp. 1-5).
Office Action (Notice of Allowance and Fees Due (PTOL-85)) dated Oct. 18, 2023 for U.S. Appl. No. 17/477,536 (pp. 1-8).
Oyama et al., "Inverse kinematics learning for robotic arms with fewer degrees of freedom by modular neural network systems," 2005 IEEE/RSJ International Conference on Intelligent Robots and Systems, Edmonton, Alta., 2005, pp. 1791-1798, doi: 10.1109/IROS.2005.1545084. (Year: 2005).
Papoulis, A. (1977). Signal Analysis. The University of Michigan: McGraw-Hill, pp. 92-93.
Prabhu, K. M. (2013). Window Functions and Their Applications in Signal Processing . CRC Press., pp. 87-127.
Schiefler, Generation and Analysis of Ultrasound Images Using Plane Wave and Sparse Arrays Techniques, Sensors (Year: 2018) 23 pages.
Smart Interface: Piezo Components with Flexible Printed Circuit Boards, www.physikinstrumente.co.uk/en/products/piezo-ceramic-components-transducers-for-oems/smart-interface/ (accessed Sep. 11, 2023) 5 pages.
"Ryoko Takahashi, Keisuke Hasegawa, Hiroyuki Shinoda, Tactile Stimulation by Repetitive Lateral Movement of Midair Ultrasound Focus, Apr.-Jun. 2020, IEEE Transactions on Haptics, vol. 13, No. 2 " (Year: 2020) 9 pages.
Bjørn Kolbrek, Modal Propagat Ion in Acous T IC Horns (Jun. 2012) (127 pages).
Chen, Xi. "Real-time Action Recognition for RGB-D and Motion Capture Data." (2014). (Year: 2014) 107 pages.
Kavan et al. (Dual Quaternions for Rigid Transformation Blending, 2006, ResearchGate, pp. 2-11) (Year: 2006).
Kussaba et al. (Hybrid kinematic control for rigid body pose stabilization using dual quaternions, Journal of the Franklin Institute 354 (2017) 2769-2787) (Year: 2017).

(56) References Cited

OTHER PUBLICATIONS

Notice of Allowance dated Sep. 16, 2024 for U.S. Appl. No. 18/305,354 (pp. 1-9).
Office Action (Final Rejection) dated Jun. 27, 2024 for U.S. Appl. No. 18/188,584 (pp. 1-5).
Office Action (Final Rejection) dated Aug. 1, 2024 for U.S. Appl. No. 18/305,354 (pp. 1-10).
Office Action (Non-Final Rejection) dated Jun. 4, 2024 for U.S. Appl. No. 18/348,663 (pp. 1-18).
Office Action (Non-Final Rejection) dated Jun. 5, 2024 for U.S. Appl. No. 18/513,902 (pp. 1-16).
Office Action (Non-Final Rejection) dated Jun. 10, 2024 for U.S. Appl. No. 17/212,774 (pp. 1-15).
Office Action (Non-Final Rejection) dated Jun. 26, 2024 for U.S. Appl. No. 16/564,016 (pp. 1-15).
Office Action (Non-Final Rejection) dated Jul. 25, 2024 for U.S. Appl. No. 17/822,224 (pp. 1-16).
Office Action (Non-Final Rejection) dated Jul. 30, 2024 for U.S. Appl. No. 18/365,313 (pp. 1-7).
Office Action (Non-Final Rejection) dated Aug. 26, 2024 for U.S. Appl. No. 18/417,653 (pp. 1-13).
Office Action (Non-Final Rejection) dated Dec. 18, 2024 for U.S. Appl. No. 18/496,002 (pp. 1-5).
Office Action (Non-Final Rejection) dated Dec. 19, 2024 for U.S. Appl. No. 18/623,940 (pp. 1-7).
Office Action (Notice of Allowance and Fees Due (PTOL-85)) dated May 30, 2024 for U.S. Appl. No. 18/359,951 (pp. 1-7).
Office Action (Notice of Allowance and Fees Due (PTOL-85)) dated Jul. 22, 2024 for U.S. Appl. No. 17/835,411 (pp. 1-7).
Office Action (Notice of Allowance and Fees Due (PTOL-85)) dated Aug. 5, 2024 for U.S. Appl. No. 17/835,411 (pp. 1-2).
Office Action (Notice of Allowance and Fees Due (PTOL-85)) dated Aug. 28, 2024 for U.S. Appl. No. 18/365,313 (pp. 1-5).
Office Action (Notice of Allowance and Fees Due (PTOL-85)) dated Dec. 11, 2024 for U.S. Appl. No. 18/648,428 (pp. 1-8).
Polychronopoulos et al., Acoustic levitation with optimized reflective metamaterials, Scientific Reports (2020) 10:4254 (10 pages).
Supancic et al., "Depth-based hand pose estimation: data, methods, and challenges." In Proceedings of the IEEE international conference on computer vision, pp. 1868-1876. 2015. (Year: 2015).
Wang et al. (Translation and attitude synchronization for multiple rigid bodies using dual quaternions, Journal of the Franklin Institute 354 (2017) 3594-3616) (Year: 2017).
Wu et al. (Strapdown Inertial Navigation System Algorithms Based on Dual Quaternions,2009, IEEE, 2005, pp. 110-132) (Year: 2005).
Zhao et al., "Combining marker-based MOCAP and RGB-d camera for acquiring high-fidelity hand motion data." In Proceedings of the ACMSIGGRAPH/EurographicsSymposiumonComputer Animation. Eurographics Association, 33-42, 2012. (Year: 2012).

\* cited by examiner

MID-AIR HAPTIC TEXTURES

PRIOR APPLICATIONS

This application claims benefit to the following two U.S. provisional patent applications, all of which are incorporate by reference in their entirety.
1. U.S. Application No. 62/788,322, filed Jan. 4, 2019.
2. U.S. Application No. 62/945,272, filed Dec. 9, 2019.

FIELD OF THE DISCLOSURE

The present disclosure relates generally to improved techniques for mid-air haptic-related interactions for textures.

BACKGROUND

The digitization of textured graphics has made huge strides and has enabled a wealth of applications. It is possible, for example, to search online databases via content-based image retrieval algorithms using graphics-only input features (rather than metadata and keywords). Graphics algorithms can then be fed with the search results and tasked with auto-generating massive photorealistic renders of virtual worlds. Physics engines that couple user interaction of these 3D worlds can then be used to synthesize textured audio creating an immersive multi-modal experience, minus the haptics.

When we search blindly through our pockets however, haptic information such as an object's compliance, the microgeometry of its surface and its friction properties is what allows us to quickly assess what's in there. Haptic technology has therefore been the focus of many research efforts in an attempt to render and communicate high fidelity textured tactile sensations. Wearable gloves, hand-held tools and vibrating electrostatic touchscreens are just a few examples of the currently available hardware contraptions capable of conducting texture information to the human haptic sensory system.

Further, mid-air haptics refers to the growing field of research that enables users to interactively touch and feel virtual objects and surfaces without having to wear or hold any specialized controllers. One prominent way of achieving this is to use ultrasonic phased arrays that electronically focus waves onto a user's hands and fingertips to create a vibro-tactile effect. Coupled with holographic visuals, mid-air haptics is a powerful tool to create immersive spatial interactions. For instance, one can feel a heart beating, hold the Earth, or remotely shake the hand of a distant collaborator. These interactions are intrinsically bi-modal, and while "seeing is believing, feeling is the truth". Therefore, visuals and haptics are equally important in spatial interactions and must be holistically considered when designing multi-modal interfaces: if visual and haptic modalities were to convey discrepant information, user immersion would be under threat.

Displaying shape and texture information on a screen or in augmented and virtual reality (AR/VR) has been an active topic of research and development for many years, ever more so with the recent proliferation of machine learning and artificial intelligence (AI) approaches to graphic synthesis. Methods for the haptic and audio rendering of texture information are also well studied fields, at least for wearable, surface, and grounded haptic interfaces.

This has not, however, been the case with mid-air haptic technology since many other challenges had to be addressed first. About a decade ago Hoshi et al. showed that ultrasound could be used to induce haptic sensation. Building on this work, subsequent studies from various laboratories, have shown that ultrasound could be used to produce multi-point feedback, render 3D volumetric shapes, and could be used to convey emotional information. On that basis ultrasonic mid-air haptic technology has been studied in car user interfaces, AR collaborative workspace and enriching media and art applications. Despite this progress, further investigations in mid-air haptic perception are still needed to bridge the gap with graphical displays.

The accurate rendering of a virtual object, whether graphically or through touch technologies depends mainly on two components: its geometry (i.e. its shape) and its material properties (i.e. its texture). To that end, research in mid-air haptics is on-going with regards to mid-air haptic shape rendering algorithms, and still at its infancy with regards to texture rendering.

SUMMARY

In this application, we demonstrate how modulated focused ultrasound can be used to generate mid-air haptic textures given an image or graphic input. We seek to promote discussion in haptic mappings and their use in human-computer interaction (HCI) for mid-air haptic rendering of textures.

In this application, we also seek to take a leap forward in mid-air haptic texture rendering by presenting a novel approach to producing congruent image-based visuo-haptic mid-air textures. Our approach combines perceptual study results and machine learning to predict the visually perceived roughness of an image texture and use that to generate congruent mid-air haptic stimuli of an equivalent perceived roughness. Through the design of haptic stimuli based on visual texture information, we can thus avoid creating discrepant stimuli that would hinder the user experience.

To attempt to achieve our goal, we undertook three user studies. In the first study, we adopted a crowd-sourced approach in order to gather perceptual assessments of roughness in image textures when exposed only to visual stimuli. Based on these results, commonly applied statistical measures of image texture and machine learning techniques, we developed and trained an image processing algorithm that can successfully predict the subjective roughness for an image texture. In the second study, we explored the perception of roughness when individuals are exposed to mid-air haptic feedback only (i.e., without any other non-haptic stimuli). Using the data gathered from the second study, we determined a relationship between the draw frequency of mid-air ultrasonic haptic feedback and perceived roughness. Further, we hypothesized that both visual and tactile roughness perception could be matched, and therefore formulated an experiment to test this. Namely, we validated our approach in a third study by evaluating participants perception of texture when exposed to both visual and mid-air haptic stimuli. In this final study, participants were able to tune the tactile parameter of roughness in order to match the visual texture displayed on screen. The results demonstrate that participant parameters for visuals matched those predicted by our machine learning model, hence validating our approach.

BRIEF DESCRIPTION OF THE FIGURES

The accompanying figures, where like reference numerals refer to identical or functionally similar elements throughout

Figure 1:
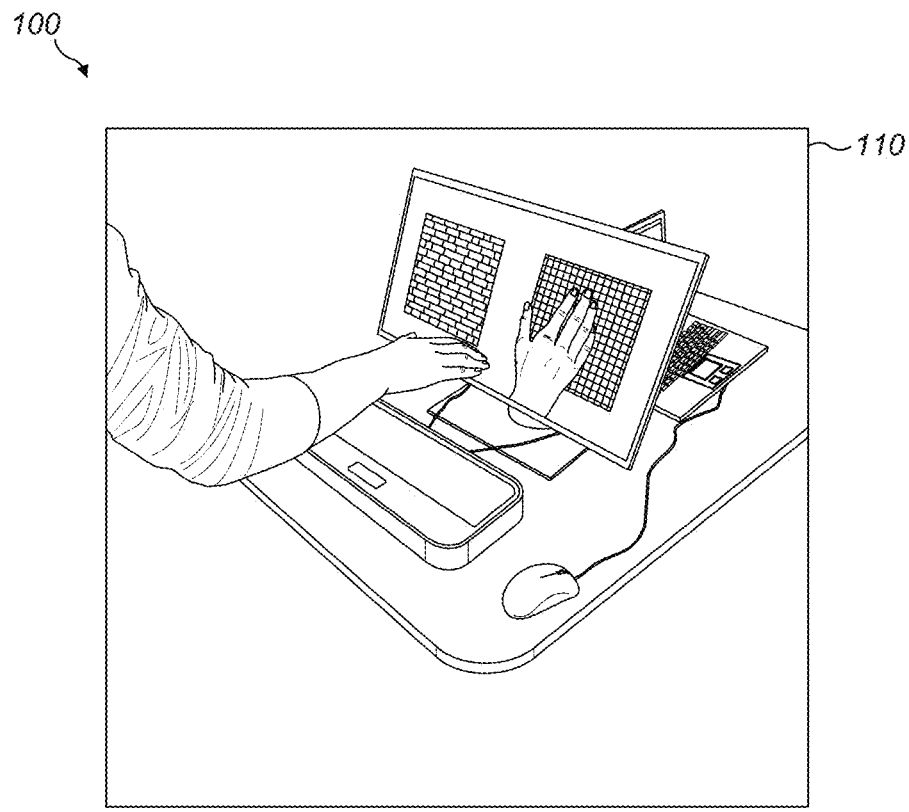
FIG. 1 shows a side view and a first-person view of a comparative demonstration of mid-air haptics-based textures.
Figure 1:
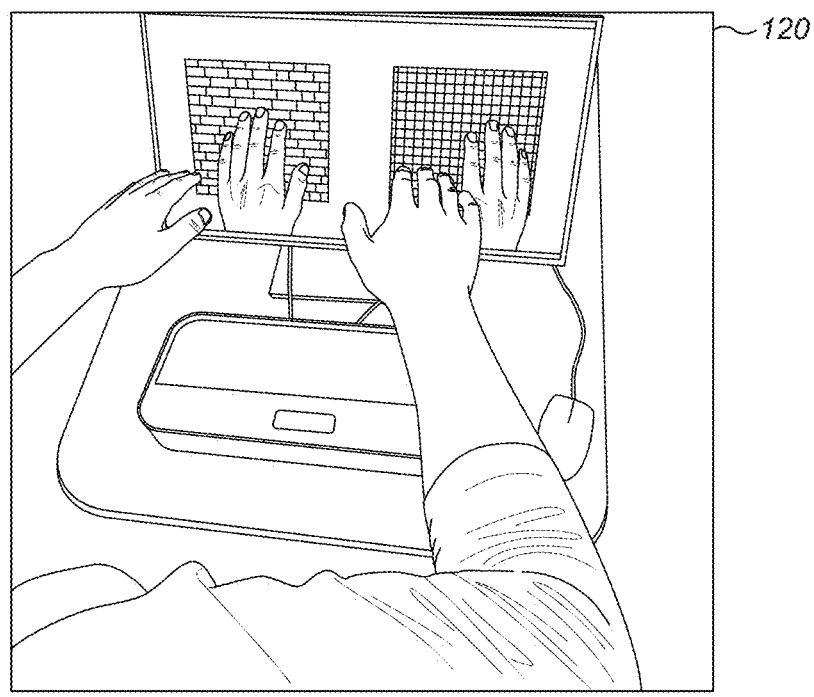

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

I. Mid-Air Haptic Textures from Graphics

The ability for haptic technology to reproduce texture information has several enabling applications, including the touch of realistic virtual copies of valuable or historical items, robotic teleoperation for medical or industrial purposes, educational and training simulations in AR/VR, and forms a key part of human-fashion interaction (HFI); textural haptic information about products and fashion items can increase online purchase intention. The method of recording the haptic feel of a real object and later reproducing it for others to interact with is called haptography.

Hand-held Tools. Impedance-type haptic interfaces such as the SensAble Phantom Omni have long been the standard for rendering textures. Notable efforts include the Penn Haptic Texture Toolkit, a publicly available repository of hundreds of haptic texture and friction models, the recorded data from which the models were made, images of the textures, and even includes the code and methods necessary to render them on a Phantom Omni (or similar).

Wearables. There are an abundance of haptic gloves that are actuated via servos, pneumatics, voice coils, piezoelectric or other vibrotactile actuators. However, haptic systems have only recently started to be designed with mobility in mind, thanks to hardware miniaturization and advancements in battery technologies. Notable recent commercialization efforts include TACTAI and GoTouchVR.

Surface Haptics. There are three means of texture reproduction on touchscreens: moving overlays, ultrasonically vibrating surfaces, and electrostatic surfaces. When a user touches the screen, an overlay is actuated using motors to produce a shear force on the fingertip. Ultrasonic surface haptic devices vibrate the screen to reduce fingertip contact time thus reducing friction. Electrostatic haptic devices can form an electric field that attract the skin thus increasing normal force and friction.

Ultrasound Haptics. Signals driving a collection of ultrasonic speakers (or transducers) are modulated such that ultrasound waves interfere constructively at one or more focus points in space such that a tactile sensation is felt when touched by the bare hand of a user. This technology was first demonstrated in Japan in 2010 and commercialized by Ultrahaptics Ltd. in 2014. When a user touches a virtual object, the contact points between his or her hand and the object are recorded and one or more ultrasonic focus points can be made to 'jump' from point to point (in some order and speed) such that the object surface is felt. Varying the order, speed or waveform of the modulated ultrasound may simulate perceivable differences in textured effects, e.g., a faster hand traversal speed may be associated with a smoother surface, and a square modulated wave with a rougher one. This approach therefore creates a 1-to-1 mapping between a virtual object's shape and the projected haptic while allowing control of three haptic input parameters. Limitations of this technique include the unwanted side effect of audible noise, and blindness to graphical rendering of texture qualities.

A. Demo Contribution

Described herein are i) the introduction of a haptic mapping function $f$, and ii) its use to translate texture information from an input image or graphic into a haptic texture sensation in mid-air, thus iii) allowing for surface-free, tool-free, and wearable-free textured haptic feedback to dynamic touch interactions with AR/VR content. This approach is not a 1-to-1 bijection mapping since different images may 'feel' the same (i.e., it's a surjection). Moreover, the demonstrated approach is robust to any 2D or 3D image and can 'see' both macro- (e.g., the direction and width of gaps between kitchen tiles) and micro-features (e.g., differences in roughness between marble or ceramic tiles). Constructing the haptic mapping function requires much testing and calibration as it strongly depends on the haptic sensation it is applied to. In this application, we use the 'circle' haptic as this is currently the most studied one. We demonstrate the effectiveness of this process (see FIG. 2 below) by generating mid-air haptic texture sensations from an image database.

B. Demo Setup

Turning to FIG. 1, shown is our demonstration setup 100 composed of a 24" LCD display, a laptop PC with mouse, and an Ultrahaptics Stratos Inspire (USI) device. The USI is ergonomically located below the display on a table. The USI uses a Leap Motion controller for hand-tracking, and 256 ultrasonic 40 KHz transducers arranged in a Fibonacci spiral (sunflower) pattern such that unwanted acoustic grating lobes are minimized.

Shown are the side view 110 and first-person view 120 of the demo where the user is exploring two different textures: bricks (left) and metal walkway (right). These are displayed on the screen and simultaneously projected onto the user's hands using the USI. Users can walk up and place their hands about 20 cm above the USI to feel the different textures displayed on the screen. Two textures are displayed side-by-side allowing for direct comparison. Users can also select different textures through a dropdown menu. The core demo features can be experienced in less than 1-minute.

C. Haptic Textures from Graphics

Figure 2:
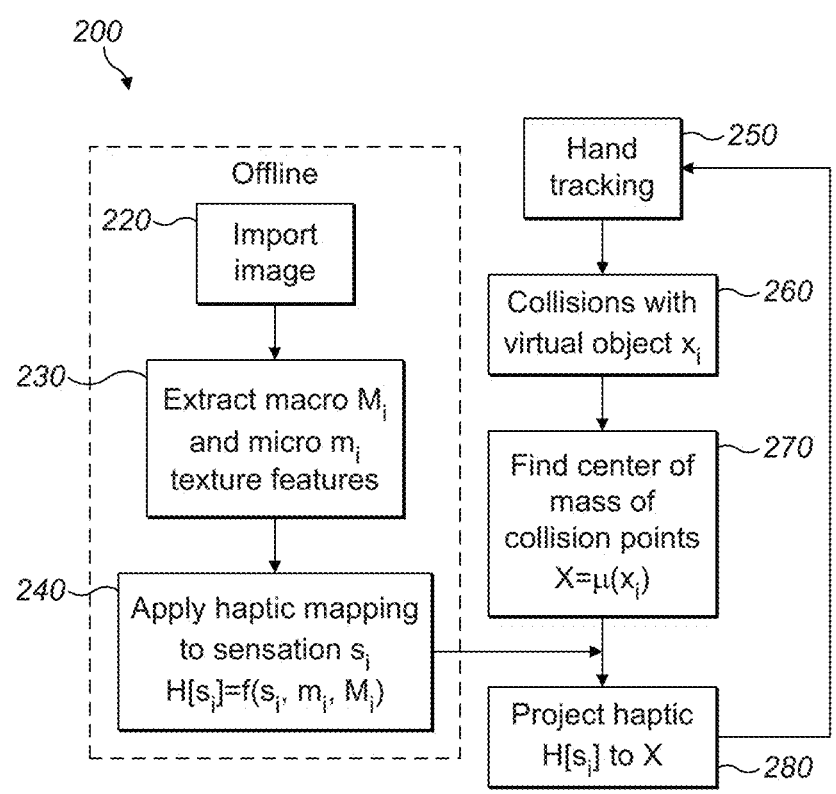
FIG. 2 shows a schematic of a method for generating mid-air haptic textures.

Turning to FIG. 2, shown is a schematic 200 of a method for generating mid-air haptic textures. An offline component 210 begins with image importation 220, proceeds to extract macro texture features Mi and micro texture features mi 230, and concludes with applying haptic mapping to sensation $s_i$ where $H[s_i]=f(s_i, m_i, M_i)$ 240.

Further, using hand tracking 250, collisions with a virtual object xx are detected 260. The center of mass of collision points $X=\mu(x_i)$ is calculated 270. The method takes in the output from the offline component 210 and projects haptic $H[s_i]$ to X 280. The method then returns to hand tracking 250 and starts the process anew on an iterative basis.

Figure 3:
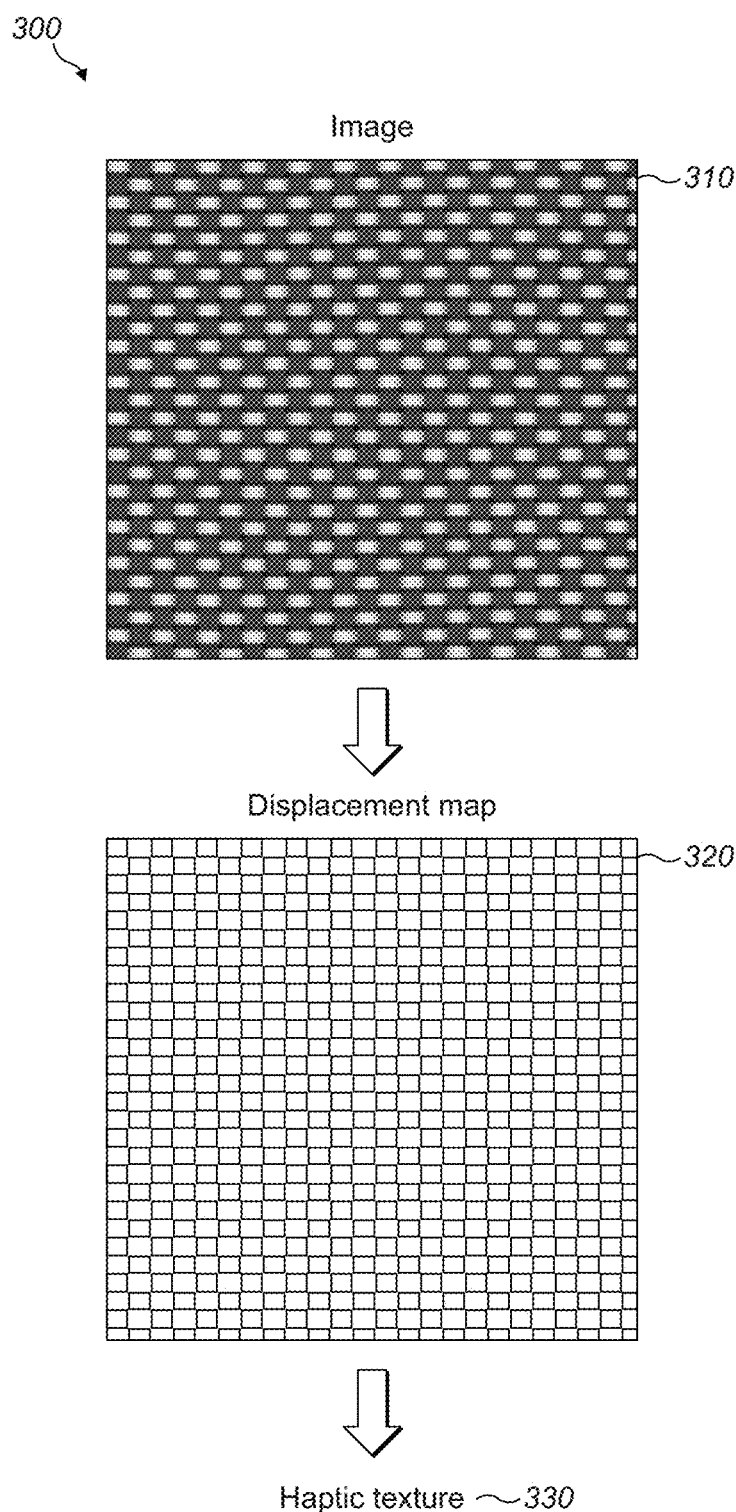
FIG. 3 shows a schematic of an extraction of a displacement map from a tile graphic to produce a haptic effect.

Turning to FIG. 3, shown is a schematic 300 of the extraction of the displacement map 320 from a tile graphic 310 to produce a haptic effect 330. The tile graphic is taken from the CC0 Textures Online Library (https://cc0textures.com/) (accessed October 2018).

Figure 4:
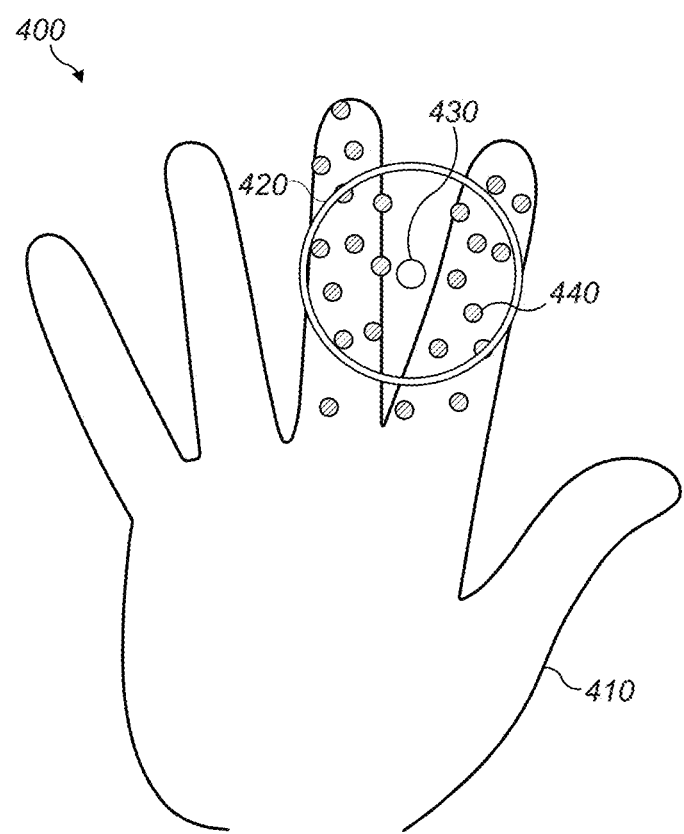
FIG. 4 shows a schematic of a hand having exemplary illustration of collision points.

Turning to FIG. 4, shown is a schematic 400 of a hand 410 with exemplary illustration of collision points xx. These are holographic touches shown as points 440 on the index and middle fingers. The center of mass of the collision points X is shown as a point 430 on which a circle haptic $s_i$ 420 is centered upon.

A displacement map allocates a grayscale value for pixels in a 2D image corresponding to height detail. These values are used to calculate the image micro- and macro-scale roughness (see FIG. 5, below).

Micro-Scale Roughness is calculated using the 2D auto-correlation function for a high-resolution image. This function establishes whether an image contains (non-)periodic features. For example, the autocorrelation function of a regular texture will contain peaks and valleys with spacings equal to the distance between the texture primitives. The autocorrelation function is most often obtained by taking the discrete Fourier transform (DFT) of the image and multiplying each coefficient with its complex conjugate before taking the inverse DFT. If the inverse DFT is not taken, the function obtained is the power spectral density (PSD) function that in this case measures the energy at each spatial scale. In addition, the PSD function can determine the coarseness of the texture, which we identify as micro-roughness. A cut-off frequency is determined first based on the hardware used and the scaling of the haptic texture. Fitting a slope to the higher frequency sections of the PSD function corresponding to frequencies above this cut-off gives us the roughness parameter we require. If the function rapidly decays then the image contains a smoother texture with texture information concentrated at lower spatial frequencies, whereas the image contains a rough texture if the function drops off slowly or flattens, indicating texture information at higher spatial frequencies. The micro roughness values (mRVs) learnt from the PSD function are then used to choose the circle haptic parameters from a look up table (LUT) that we have constructed a priori through user testing. The LUT maps an mRV to a 'circle draw speed' and haptic sample points which is projected onto the user's hands when 1) the hand is located within the bounds of the textured image, and 2) the hand has a velocity above a pre-defined threshold value (there is no texture sensation on a stationary hand). The corresponding haptic is projected at the center of mass $X=\mu(x_i)$, the average of all recorded collision points $x_i$ on the user's hand, (see FIG. 4). We have also constructed a library of different LUTs for haptic sensations other than the circle.

Macro-Scale Roughness is closely coupled with the dynamic exploration of the textured surfaced. We achieve this by setting the circle haptic intensity to be proportional to the displacement map value at DM(X). Hence, the haptic intensity perceived by the user varies dynamically in strength according to the location of X, i.e., the main touch point of the user's hands with the graphic. The acoustic radiation force is due to the focused ultrasound. Therefore the strength of the haptic sensation is modulated between a minimum value corresponding to the vibrotactile threshold and the maximum output power of the USI.

Figure 5:
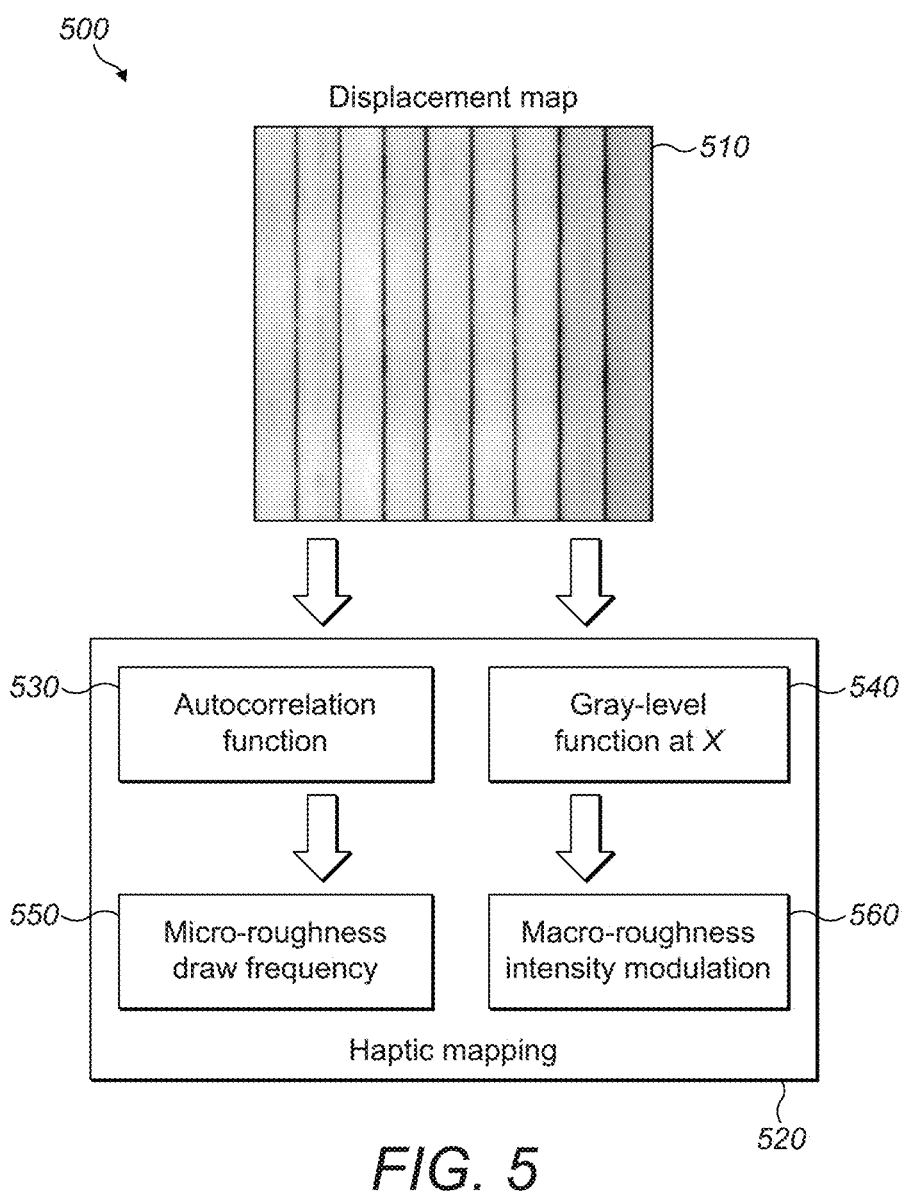
FIG. 5 shows a schematic of extracted features of a displacement map associated with a haptic mapping function block.

Turning to FIG. 5, shown is a schematic 500 of extracted features of an image displacement map 510 associated with a haptic mapping function block 520. The haptic mapping function block 520 consists of an autocorrelation function 530 resulting in a micro-roughness draw frequency 550, and a gray-level function at X 540 resulting in macro-roughness intensity modulation 560. The autocorrelation of the displacement map is used to define micro-roughness parameters that control the draw frequency of a haptic pattern. The gray-level function at the dynamic touch position X is used to define macro-roughness parameters that control the ultrasound intensity level being outputted. Applying both micro- and macro-scale texture calculations simultaneously to mid-air haptic sensations (e.g., a circle tactile pattern) is what we call haptic mapping.

D. Further Study

Figure 6:
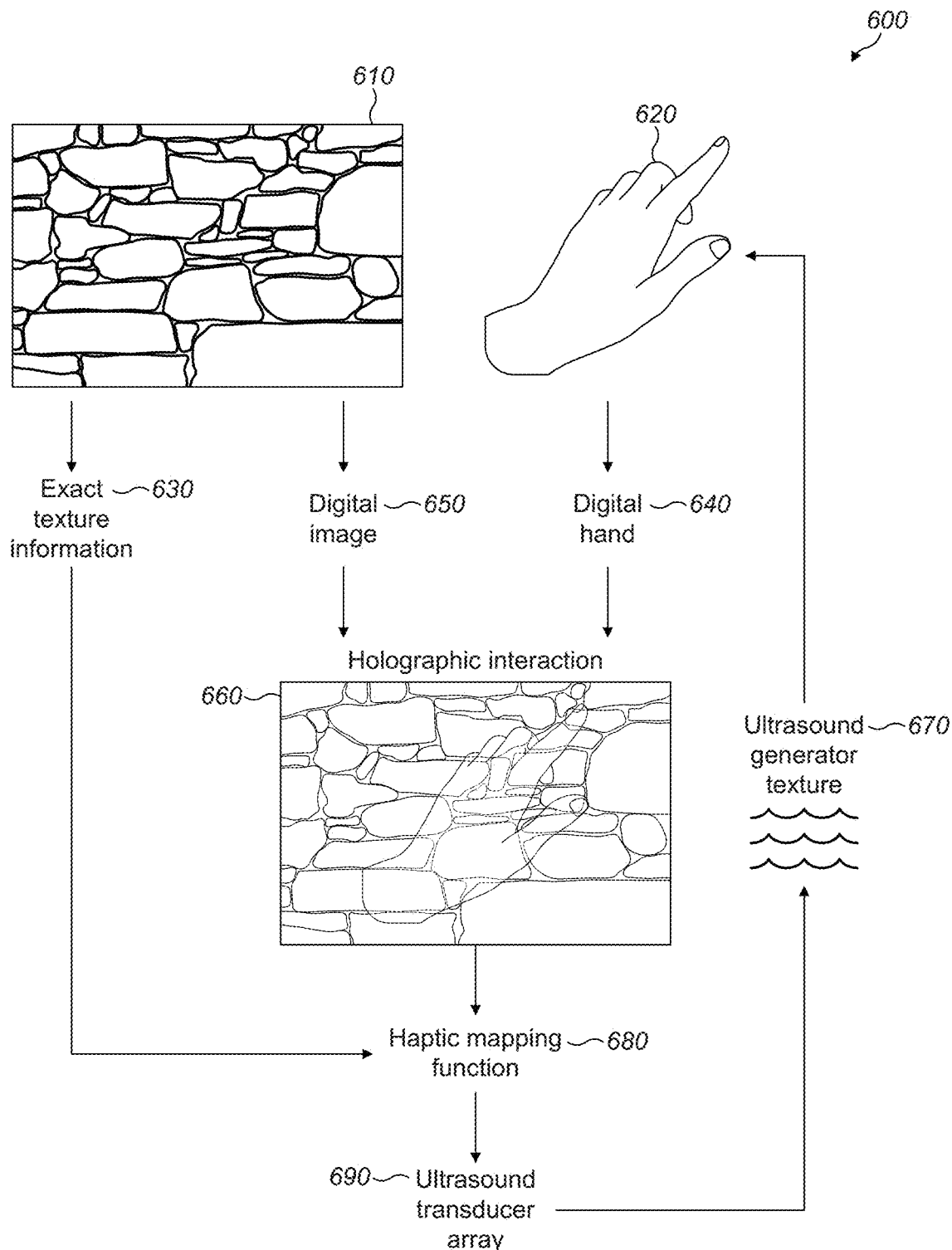
FIG. 6 shows a schematic of a system for generating mid-air haptic textures using an ultrasonic transducer array.

Our procedure for rendering texture from graphics using mid-air ultrasonic haptics links dynamic exploratory touch with spatial variations in image graphic textures (both micro and macro features) and projects these rich tactile sensations directly onto the user's bare hands through an impinging ultrasonic pressure field Turning to FIG. 6, shown is a schematic 600 of a system for generating mid-air haptic textures using an ultrasonic transducer array. Starting with a texture 610, texture information is extracted 630 and provided to the haptic mapping function 680. In parallel, a digital image 650 is taken from the texture 610 and digital hand-related information 640 is taken from features and movements of the hand 620. The digital image 650 and digital hand-related information 640 are processed via holographic interaction 660 and then provided to the haptic mapping function 680. The haptic mapping function 680 then generates the necessary signals for the ultrasound transducer array 690 to produce ultrasound generated texture 700 that is felt by the hand 620.

Thus, the method avoids possible sensory conflicts due to inconsistency between a haptic texture and its visual representation. Moreover, the method is robust against computer graphic rendering techniques (e.g., normal and bump maps) and can therefore be applied to a vast range of applications. Our demo provides insights towards the furthering of immersive AR/VR experiences with mid-air haptic textures, as well as the enabling opportunity for the substitution of real fabric textiles with ultrasonic replicas, what is effectively a step towards new HFIs paradigms where users of VR-dressing rooms and online shops can touch and feel digital haptic textures.

II. Predictive Model for Rendering Roughness in Visuo-Haptic Mid-Air Textures This application proposes a new approach to generating mid-air haptic textures based on the visual representation of various materials. Our main contributions are the following: a) a model to predict perceived roughness from visual pictures: b) a method to translate perceived tactile roughness to mid-air haptic input parameters: and c) a user validated end-to-end algorithm capable of rendering mid-air haptic textures from visuals.

A. Introductory Concepts

Texture. Historically the word 'texture' (Latin 'textura') is related to that of woven fabric, appraised and appreciated through the sense of touch. Since then, the word has grown to become a highly global percept used more generally to describe the surface characteristics of an object which are distinct from its human-scale geometry. Because of this generalization however, there is little consensus as to what constitutes texture.

In fact, an assumed definition can only be obtained when an object's surface is discussed from the standpoint of the sensory system being used to transduce it. While texture is predominantly considered as a property that lies within the domain of touch, it is in fact multisensory. As such, texture can be separated into three distinct groups: visual texture, auditory texture, and tactile texture.

Texture contains numerous potential dimensions that traverse these three sensory modalities. For example: Shine/matte, coarse/fine, rough/smooth, hard/soft, or sticky/slippery. Some of these descriptors are applicable primarily to one specific modality, e.g. 'shine' is for vision, but 'rough' and many others may apply to multiple modalities. Across these different texture groups, researchers have attempted to provide definitions with varying success. A good example is that by Tamura et al. who attempted to define visual texture by stating: "We may regard texture as what constitutes a macroscopic region. Its structure is simply attributed to the repetitive patterns in which elements of primitives are re-arranged according to a placement rule".

Just as texture is difficult to define as a concept, measures of perceived texture are also equally elusive. For example, while various features, such as surface element spacing and density of a homogeneous surface can be measured objectively using complicated apparatus, it is difficult to recreate their perceptual features. Similarly, while one can view the structure of a surface as a pattern arising from the repetition or randomness of smaller local sub-patterns and use these variances to discriminate between different types of textures, one cannot directly assign a subjective or perceptual label to them. Nonetheless, the measurement of sub-pattern features contributes heavily towards the assessment of a surface finish in the manufacturing purposes. Therefore, while these standardization efforts go as far as the reliable reproduction of a pattern, the relationship between these metrics and the subjective perception of texture is still not clear, and nor are those of the modality used.

Visual Texture Perception. General usage of the term 'texture' is most often associated with how an object feels when touched. However, humans often utilize visual observation to infer different material properties that comprise the surface of an object, most commonly referred to as 'visual texture'. In fact, variations in visual texture heavily inform our interpretation of the world, and provide us with cues to understand the shape and orientation of a surface. Just as pattern variations in surface structure can lead to perceptually different tactile sensations, the human visual system also creates its own complimentary interpretation of these patterns.

Humans require the use of adjectives to interpret the various qualities found in texture in a natural and ubiquitous way, such as: roughness, directionality, contrast, and regularity. In particular, Tamura et al. has shown that coarseness, contrast, and directionality play a fundamental role in the visual interpretation of surface textures. However, the use of vague language to describe variations in visual texture may be interpreted very differently between individuals, affecting the consistency with which such subjective interpretations may be measured.

To that end, attempts have been made to associate human perceptual dimensions to quantifiable image attributes, such as roughness being related to the spatial size and density of texture primitives, known as texels. Furthermore, an alternative approach has been to vary pixel gray-level intensity throughout different local patterns within an image to elicit perceptually noticeable variations in texture dimensions. Considering the dimension of roughness specifically, four visual cues are commonly utilized. These are the proportion of image in shadow, the variability in luminance of pixels outside of shadow, the mean luminance of pixels outside of shadow, and the texture contrast.

In reality, texture is experienced as an entirely integrated sensation, where aspects of both visual and tactile modalities influence one's response to a texture. Previous work has identified that both these modalities operate in parallel, and feature consistency in interpretations of three textural dimensions: roughness, hardness, and slipperiness. With that being said, early work by Binns, showed that humans are capable of similar performance during texture classification whether using vision only or both vision and tactile modalities. With regard to singular dimensions, Lederman and Abbot demonstrated that texture roughness is perceived equivalently whether using vision, haptic or visuo-haptic modalities.

Tactile Texture Perception. The term 'tactile texture' relates to surface and material properties that are perceived by our finger upon contact with an object's surface. These can be a static (pressing down) or dynamic (sliding) tactile interaction. During the tactile exploration of an object and its surfaces, tactile qualities such as surface friction, roughness, and temperature are revealed. Moreover, different tactile dimensions are revealed depending on the type of tactile interaction one uses. As the hand/finger skin surface makes contact with an object's surface, the central nervous system is informed about the qualities of the contact. This influences our perception towards exploring, grasping, and manipulating our environment.

To that end, work by Okamoto et al. suggests there are three fundamental perceptual tactile dimensions. These are: roughness (rough/smooth), hardness (hard/soft), warmness (cold/warm). The perception of roughness can be further broken down into stickiness, and wetness (moist/dry). Research has also suggested that surfaces with grating wavelengths above 1 mm (macro) are perceived in a different fashion in contrast to surfaces with wavelengths below 1 mm (micro) therefore introducing a multi-scale element into texture perception.

While objects can be assessed visually (without making physical contact with the surface of an object) there is no way to obtain a full understanding of the shapes, textures, and materials that surround us by visual means alone. For example, seminal work by Katz, surmised that surface roughness cannot be estimated without the lateral motion between the object and the skin.

Roughness features are often classified in two levels (macro/micro) due to the different mechanoreceptors activated following either spatial or temporal stimulation during surface exploration. For coarse surfaces with many macro-scale roughness features, neuro-physiology studies have shown that the spatial distribution of SA1 (Merkel) receptor cells contribute to the perception of roughness, but the temporal information due to skin vibration during dynamic exploration of a surface does not. Conversely, for fine (micro) surface textures, motion is a necessary part of the haptic perception. Specifically, FA1 (Meissner) and FA2 (Pacinian) receptor cells are related to the perception of fine roughness, and require dynamic stimulation to perceive any micro-roughness features.

Visual Texture Analysis. Due to the many similarities between tactile and visual modalities in the assessment of roughness, we were motivated to study these in unison. Our approach thus involved extracting specific image texture features with which a subjective value of roughness could be predicted. Using this value, ultrasonic mid-air haptic feedback could then be tailored to produce a tactile equivalent sensation. Feature extraction from images has been a fastidiously researched area of computer vision, with numerous methods having been exploited (e.g., statistical, geometric, model-based).

Gray-level co-occurrence matrices are a commonly used statistical approach for image texture analysis due to their simplicity and easy interpretability. This method examines variations in pixel intensity values throughout an image across a given distance d and angle θ, to form a matrix with dimensions relative to the number of possible gray-levels contain within an image. The formulation of an image's gray-level co-occurrence matrices (GLCM) compiles both spatial and statistical information, and enables the computation of second order statistics, known as Haralick features. This approach has been widely adopted across various fields, such as, medical image analysis, object recognition from satellite imagery, and image classification tasks.

GLCM express the joint distribution probabilities that neighboring pixels occur within an image across relative polar co-ordinates (d, θ). For an image I with size (N×M) and p gray-levels, the $(i, j)^{th}$ value within the resulting GLCM will express the number of times the $i^{th}$ and $j^{th}$ pixel values occur in an image when evaluated across the offset (d, θ).

A non-normalized GLCM can be computed as:

$$GLCM_{\Delta x, \Delta y}(i, j) = \sum_{x=1}^{N}\sum_{y=1}^{M} p(x, y) \quad (1)$$

where $$p(x, y) = \begin{cases} 1, & \text{if } I(x, y) = i \text{ and } I(x + \Delta x, y + \Delta y) = j, \\ 0, & \text{otherwise}, \end{cases} \quad (2)$$

where x and y are the co-ordinate positions in image I, and I(x,y) indicates the pixel value at the relevant co-ordinate position. Selection of appropriate values for d can be difficult to infer, and misinterpretation of this value can lead to an incorrectly calculated matrix that does not capture the underlying structure of an image texture. However, Zucker and Terzopoulos document a strategy to overcome this by comparing matrices created over multiple spatial relationships and calculating the associated $\chi^2$ value of each matrix. Higher $\chi^2$ values reflect a value of d that more accurately captures the underlying structure of an image texture. An interesting caveat of this method is its robustness to image magnification.

In association with GLCMs are various second-order texture measures known as Haralick features. Haralick first proposed 14 types of feature statistics based on GLCMs. These can be split into 3 groups: Contrast, orderliness, and descriptives, as previous work has shown these groups to be independent of each other. Within the Contrast group, measures of contrast (CON), dissimilarity (DIS), and homogeneity (HOM)/inverse difference moment (IDM), exist to explain the relative depth and smoothness of an image texture at a given offset. Angular second moment (ASM), or energy (VASM), and entropy (ENT), all contribute towards assessments of orderliness of pixel gray-level dispersion within an image texture. Descriptive measures are calculated on the entire 2-D matrix, offering first-order descriptive measures on the second-order spatial information captured during computation of an image's GLCM. Mean, standard deviation, variance, and correlation of matrix values can be computed within this group. In addition, the measures cluster shade and cluster prominence can be calculated to evaluate symmetry within the matrix.

Different Haralick feature combinations have been applied to measure image texture throughout numerous fields. Zhang et al. used ASM, CON, COR, and ENT for measuring texture from satellite imagery. Others have applied these features for the detection of cancers. We apply this approach to the HaTT image library in order to generate features for our prediction model training phase.

Tactile Texture Rendering. Rendering haptic virtual texture has focused many efforts in the haptic community and has been applied to many apparatus such as force-feedback devices, pin-arrays, vibrotactile actuators and an ultrasonic plate. Most of these approaches tune one or several output parameters to vary the perceived texture of the tactile stimuli. Among these parameters frequency and waveform have shown greater influence on the perceived tactile texture. It has been noted that exploration motion also plays an important role in texture perception. Therefore, researchers have been exploring the relationship between the feedback output and exploration motion speed, using pre-recorded data.

Moving from contact devices, few attempts at rendering tactile textures in mid-air have been made. Using an algorithm based on surface tessellation, Freeman et al. have been able to reproduce basic texture in mid-air. More recently, an algorithm extracting macro-roughness from graphics has been proposed. Using this information authors leverage bump-maps to produce virtual haptic textures in mid-air. In these bump maps, higher points have higher intensity, and lower points lower intensity. However, these studies focus on macro-roughness, as oppose to micro-roughness. To our knowledge, there are no studies investigating the perception of roughness in mid-air, even less combining it with visuals.

As one can see from our thorough literature review, vision and touch share 3 dimensions. In this application, we limit our scope to the main texture dimension, namely roughness. Additionally, we will focus on Visual and Tactile roughness, and exclude auditory roughness.

B. Understanding Subjective Visual Roughness

Our assumption underlying this work was that image data alone can be used to produce an equivalent haptic sensation that approximates the subjective level of roughness contained within a texture image. In order to explore this assumption, a visual texture database was required that had been subjectively assessed for the textural dimension of roughness. A suitable image database had to meet a number of prerequisite criterion, which were: 1. The data set must contain surfaces textures, 2. textures must contain a single homogeneous, or near homogeneous texture, 3. images must have been taken from a constant viewpoint, 4. images must be constantly illuminated, 5. must have been acquired from real surfaces, 6. images must contain a high enough resolution from which to capture exact detail, 7. data set must be sufficiently large (>50). Numerous image data sets were assessed, such as Brodatz, MIT Vision Texture (VistTex) database, PerTex database, Drexel database, and Penn Haptic Texture Toolkit (HaTT). Only the HaTT image data set appropriately met each requirement. However, 2 of the 100 images, ("playing card square. bmp" and "candle square.bmp"), were removed from the HaTT during this stage because these images violated our criteria.

Crowdsourcing Data Collection. Accurate perceptual assessments for a given data set are impinged on the collection of data from a sufficient number of observers. Traditional recruitment techniques, such as the recruitment of university students can prove difficult particularly for longer trials (>1 hr). In order to overcome this concern, we incorporated a crowd-sourced approach by utilizing Amazon's Mechanical Turk (AMT). The benefit of this approach was that a much larger user group could be obtained for a small monetary reward. 187 participants were recruited through AMT. Participants were first given a consent page to complete along with a description of what was required of them during the task. They were then presented with each of the 98 images consecutively in a randomized order. Their task was to rate each image across the textural dimension of roughness, as per Okamoto et al.'s description. Assessment of all 98 images was considered the entire Human Intelligence Task (HIT). Participants were given a maximum time limit of 3 hours to complete the task, as it was expected that the process may have taken an extended period of time, therefore a substantial time period was allowed, with the expectation that participants may have required breaks between roughness assessments. The mean time taken by users was 50 mins. Participants were required to be AMT Masters, have a HIT approval rating of >95%, and have over 1000 HITs approved. These caveats helped to minimize the risk of poor quality data being collected. In addition, a unique randomized ID was given at the beginning of the study that was to be entered upon completion of the study. This step acted as a validation method to ensure participants completed the HIT in its entirety. In return for their time, participants were rewarded with $7.40/hr, slightly over US minimum wage.

An absolute magnitude estimation procedure was applied during the subjective roughness assessment. No reference stimuli was first provided, instead participants were presented with a slider positioned below each image, with the adjectives "rougher" and "smoother" at each end point. No value range was provided, other than these adjectives. The goal was to establish individual participant ranges during their image roughness assessments.

Results. Efforts were taken to reduce the possibility of missing values for images, in the form of a response requirement before the next image in the set was displayed on screen. Participant data were cleaned if any image in the set was missing a roughness value. From the 187 initial responses, 114 were retained. Data for each participant was standardized across a range of 0 100, so their individual range for roughness was retained, but distributed evenly for all users. Data for each image were not normally distributed so median roughness values are reported and utilized throughout this work.

C. Perceptual Roughness Prediction Model

Having obtained a collection of perceptual data for the 98 images from HaTT data set, our ensuing task was to design and implement a prediction model that could successfully approximate a subjective value of roughness for any 2-dimensional image texture passed to it. While feeding an image's raw pixel values directly into a convolutional neural network (CNN) is a commonly adopted image processing method, particularly for classification tasks, we computed a series of additional features based on the computation of a GLCM. Our reasoning for this was that we wanted our network to learn associations on the underlying structure contained within the entirety of the image texture. To that end, our model takes as input several features collected through this processing step, in addition to the matrix itself and the pixel data from the image. The following subsections describe in detail each of our feature sets.

1. Feature Encoding

Image Feature Data. Texture images from the HaTT image data base were encoded as 24bpp 1024×1024 bitmaps. We resized each image to 256×256 pixels, using a constant scale factor. Images were then converted to grayscale and down sampled to 8 bits per pixel with anti-aliasing applied, in order to produce 256 gray levels. This processing step reduced file size and enabled a GLCM to be computed with size $(2^8)^2$. This information was passed into our CNN as a 2D matrix with the shape 256×256, with height and width being 256, and gray-level set as 1.

GLCM Feature Data. GLCMs were computed for each image in the HaTT image data set. Firstly, an array of pixel distances (d=1, . . . , 20) were defined, and matrices were produced at each distance step across displacement vectors ($\theta$=0°, 45°, 90°, 135°) respectively. Taking Zucker and Terzopoulos' approach to correctly build a matrix that represents the underlying structure contained within each image, we calculated $\chi^2$ values for each matrix, and selected the matrix that produced the highest value for d. Once an appropriate value for d was established, we generated 4 matrices for each displacement vector. Transposed matrices were also created in order to represent relationships between pixels across the horizontal, vertical, and both diagonal directions. Summation of each matrix for a given value of $\theta$ and its transpose, as well as averaging between directions, allowed for the constructed GLCM to be symmetric and semi-direction invariant. Values were then normalized so that the resultant matrix contained the estimated probabilities for each pixel-co-occurrence. For our prediction model, this matrix was converted to a 3D matrix in the shape of 256×256×1, and passed as an input to a separate CNN with the same architecture as our image CNN.

Haralick features data. From the computation of each image's GLCM, a series of second-order statistical measures, known as Haralick features, could be calculated. To ensure our feature set contained independent variables, we computed features for the separate groups Contrast, Orderliness, and Descriptives. For the contrast group we selected the measure homogeneity (HOM) and energy ($\sqrt{ASM}$) for the orderliness group. We also computed mean, standard deviation, and maximum correlation coefficient (COR) for the descriptives group, and included cluster shade and prominence to assess symmetry in the GLCMs. As such, a total of 6 features were used as inputs to our model as a separate Multi-Layer Perceptron (MLP) network.

2. Model Architecture and Learning

In order to process both our GLCM and image, we constructed a network with 3 convolutional layers with Rectified Linear Unit (ReLU) activations, and He normal kernel initializers. The first convolutional layer applies a series of 16 7×7 filters to the image and GLCM, which is followed by a 4×4 max pooling layer to reduce the dimensionality of the image and GLCM data. Filter size is then reduced to a series of 16 3×3 in CNN layers 2 and 3. After CNN layer 2, another 4×4 max pooling layer is applied, with a final 2×2 max pooling layer after CNN layer 3. The subsequent output is then flattened and passed to a fully connected layer of 16-dimensions with ReLU activations, and L2 kernel regularization set to a value of 0.1 in order to minimize overfitting. This architecture was used for both GLCM and image feature data as separate input channels. Haralick feature data was processed using an MLP with 2 fully connected layers of 16-dimensions, and L2 kernel regularization applied to the second layer set to a value of 0.1, again to ensure overfitting was minimized. Each 16-dimension fully connected layer from the 3 models was then concatenated in order to return a single tensor passed to a fully connected layer with 3 dimensions and ReLU activations. The output layer generated used a sigmoid activation function in order to output a predicted value of subjective roughness in the range of 0-100. The model was trained using the mean absolute error (MAE) between the predicted values and observed median subjective roughness values obtained during our crowd-sourced data gathering exercise. The Adam optimizer with Nesterov momentum and a learning rate of 0.0005 was implemented, and a batch size of 1 applied. Our model was built using Tensorflow and the Keras API in Python and ran on a Nvidia GTX1070 GPU.

3. Model Performance

Using the scikit-learn API, we split our image data set (98 images) into separate train (80 images), validation (9 images), and test (9 images) sets, and trained our model over 150 epochs. Splitting our data set in this way acted as cross-validation to minimize over-fitting.

We examine how accurately our model could predict the observed median subjective roughness values obtained during our crowd-sourcing task. Our model achieved a mean absolute error (MAE) of 6.46 on our training set, and 9.73 on our validation set. Our model achieved a MAE of 4.246, mean squared error (MSE) of 35.6, and a mean absolute percentage error (MAPE) of 10.45% on the 9 images contained in our test set data.

Figure 7:
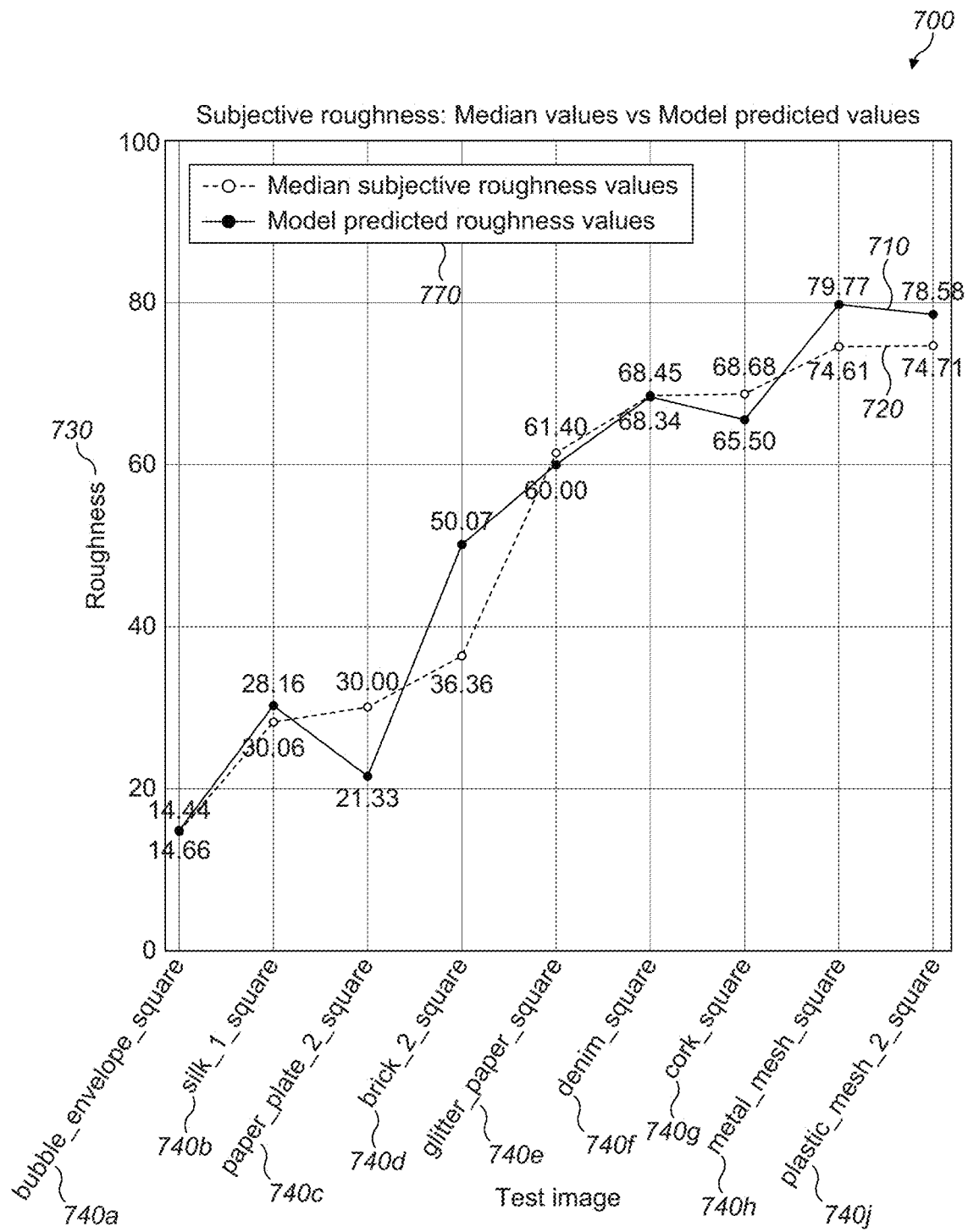
FIG. 7 shown is a graph comparing model predicted roughness values and observed median subjective roughness values from crowd-sourced data.

Turning to FIG. 7, shown is a graph 700 displaying line plots 770 comparing model predicted roughness values (filled-in circles) and observed median subjective roughness values from crowd-sourced data (open circles). The x-axis shows various test image textures, including bubble envelope 740a, silk 1 740b, paper plate 2 740c, brick 2 740d, glitter paper 740e, denim 740f, cork 740g, metal mesh 740h, and plastic mesh 2 740j. The y-axis 730 is a roughness value normalized from 0 to 100.

Figure 8:
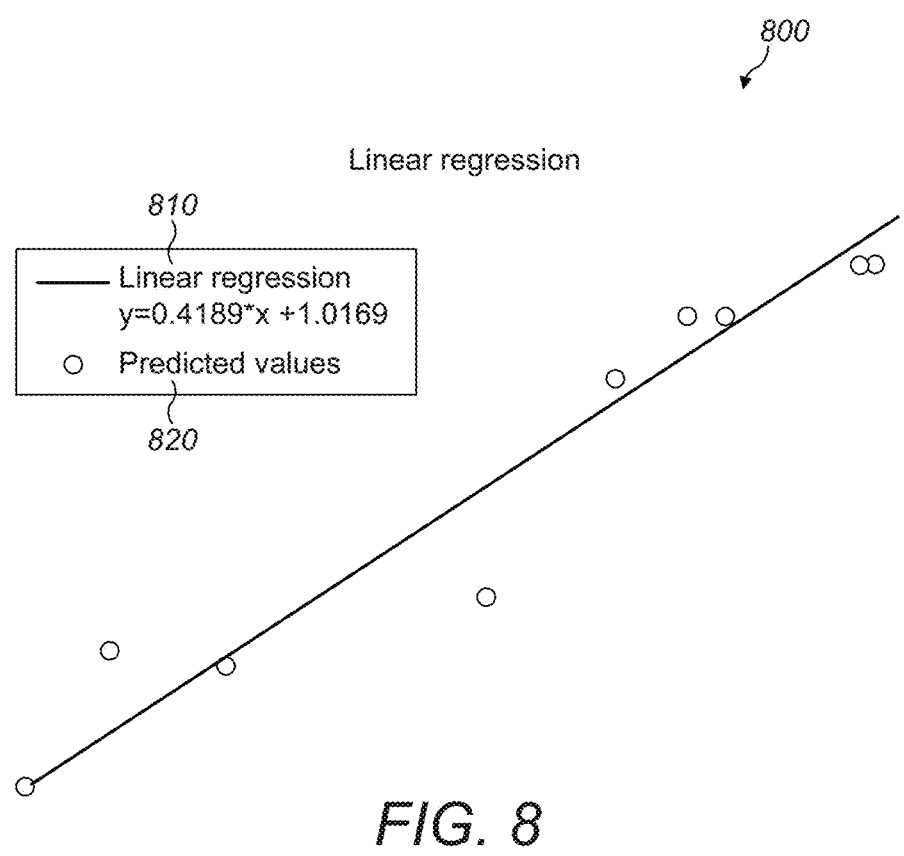
FIG. 8 is a linear regression of data in FIG. 7.

Turning to FIG. 8, shown is a graph 800 of a linear regression plot 810 between observed median subjective roughness values and predicted values 820 from our model. This linear regression was conducted to examine our model's goodness of fit. An $R^2$ value of 0.92, or 92% accuracy was observed in the model's predictions on test set data.

As a further assessment of our model's output, we conducted non-parametric analysis against our crowd-sourced median subjective visual roughness values for our test set data. As assessed by visual inspection of boxplots and Shapiro-Wilk tests, crowd-sourced subjective roughness ratings violated the assumption of normality (p<0.05 for all). A Spearman's rank-order correlation test was run in order to examine the relationship between the model's predicted values and the median observed subjective visual roughness values obtained during the crowd-source study. A statistically significant, very strong positive correlation between model output and observed visual roughness was found $r_s(9)=0.929$, p<0.001.

In order to explore further the accuracy of the model's predicted value of roughness in contrast to the entire distribution of values obtained during the crowd-sourcing study, we conducted one-sample Wilcoxon signed rank analysis on each individual image from our test data set. Table 1 displays the output from this analysis. Median values are reported for subjective visual roughness, as well as the IQR range, including Q1 and Q3. Predicted values are similar to distributions of crowd-sourced subjective roughness values for 5 of our 9 test set images, when assessed using Wilcoxon analysis.

Our model predicted a significantly higher subjective value of roughness for the texture image brick 2 than the median roughness value obtained during our crowd-sourcing study (difference=13.71, p<0.001). This was also the case for texture images metal mesh (difference=5.15, p<0.001), and plastic mesh 2 (difference=3.86, p=0.009). The prediction value for the image texture was significantly lower than the median roughness value for paper plate 2 (difference=−8.68, p<0.001). We speculate that our model did not achieve an even higher accuracy because human visual perception can be inherently inconsistent, as people have their own subjective experience in evaluating roughness. This inconsistency is reflected in some of the large inter-quartile ranges found in our crowd-source data set. As such, this makes it a challenging task to achieve perfect accuracy.

TABLE 1

| Texture Name | Visual Roughness | Predicted Roughness | Wilcoxon |
|---|---|---|---|
| brick 2 | M = 36.36, IQR = [20-63(43)] | 50.07 | <0.001 * |
| bubble envelope | M = 14.44, IQR = [6-30(24)] | 14.66 | 0.153 |
| cork | M = 68.68, IQR = [45.8-89(43.2)] | 65.49 | 0.431 |
| denim | M = 68.45, IQR = [55-82(27)] | 68.34 | 0.944 |
| glitter paper | M = 61.39, IQR = [36-72(36)] | 60.00 | 0.311 |
| metal mesh | M = 74.61, IQR = [51.1-89(37.9)] | 79.76 | <0.001 * |
| paper plate 2 | M = 30.00, IQR = [17-53.6(36.6)] | 21.32 | <0.001 * |
| plastic mesh 2 | M = 74.71, IQR = [55-88.9(33.9)] | 78.57 | 0.009 * |
| silk 1 | M = 28.16, IQR = [14-45.8(31.8)] | 30.06 | 0.912 |

Table 1: One-sample Wilcoxon test results on comparisons between visual roughness ratings, and model predicted roughness. The roughness range is normalized to lie between 0 and 100.

D. Mid-Air Haptic Roughness Perception

Having trained our model and tested its performance against our 9 image test data, our next step was to determine how a prediction of visual roughness could be applied to a mid-air ultrasonic haptic sensation. As discussed previously, frequency is one of the main parameters influencing tactile texture perception. Due to this we then sought to establish a relationship between mid-air haptic frequency and its associated perceived roughness.

The texture data used in this study were taken from a previous work (unpublished work accepted for publication) that explored user ratings of several scales of STM patterns. For this study, we only kept the circle with of perimeter 20 cm (i.e. 3.18 cm radius) and the associated roughness ratings.

The setup included an Ultrahaptics Evaluation kit (UHEV1) from Ultrahaptics Ltd. embedded at the bottom of an acrylic laser-cut black box. A squared hole on the top of the box let the participants received the mid-air haptic pattern on their palm.

A total of 11 participants rated the perceived roughness of 20 different frequencies: ranging from 5 Hz to 100 Hz with a 5 Hz step. Participants reported their answer using a Likert scale (1-9 from smooth to rough), presented on screen.

Figure 9:
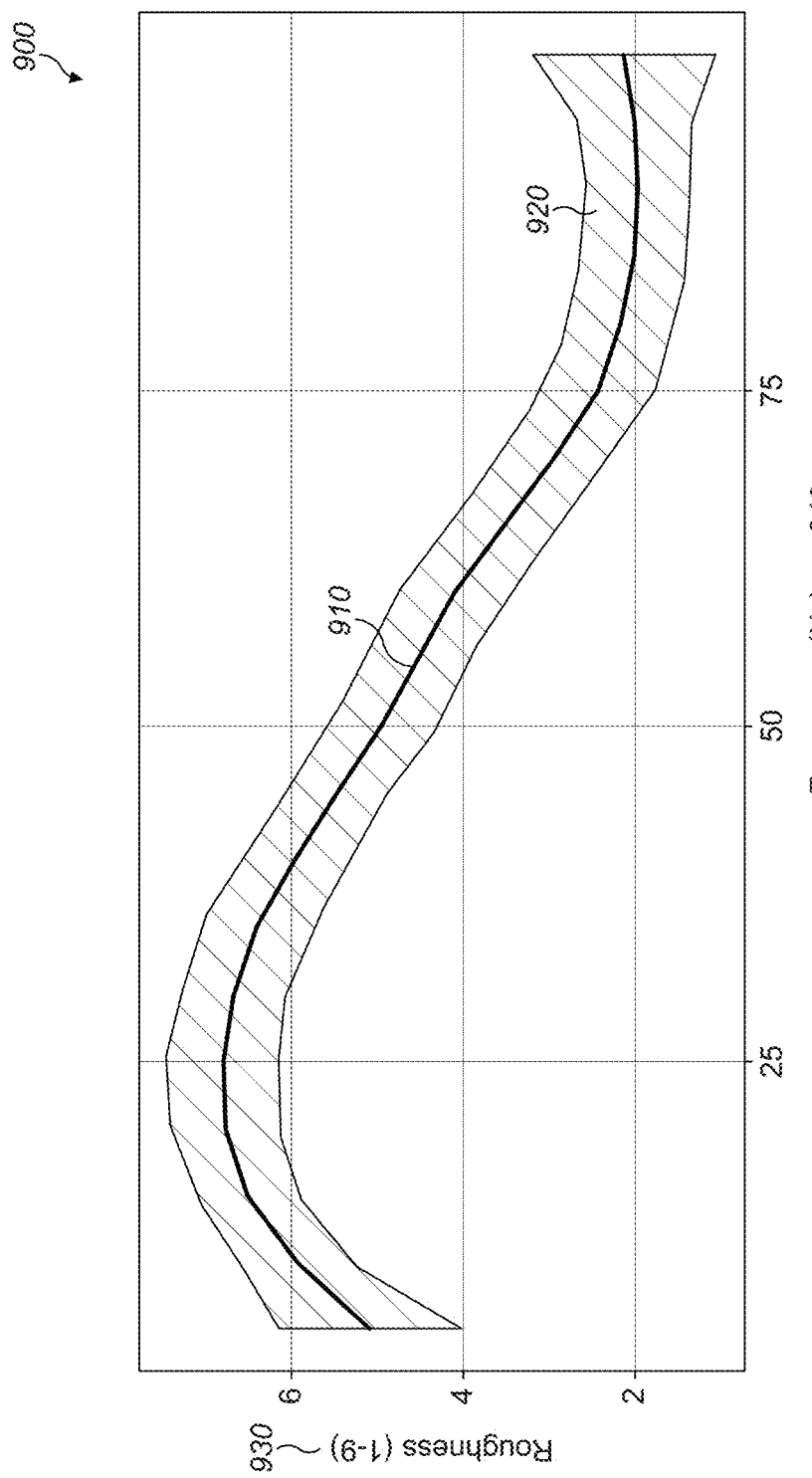
FIG. 9 is a graph showing a relationship between mid-air haptic frequency and its associated perceived roughness.

Turning to FIG. 9, shown is a graph 900 presenting the results for the 20 cm diameter circle. The x-axis 740 is the draw frequency and the y-axis 930 is the Likert scale. The plot incudes the mean haptic 910 and standard error 920 of the roughness rating across a draw frequency.

From this graph, it was hypothesized that 25 Hz provides a significantly higher roughness than 75 Hz when displaying a circle of 20 cm. This result was confirmed in a second user study.

In this work, we are adding the hypothesis that the roughness ratings are linear on the range from 25 Hz to 75 Hz ($R^2$=0.91). Therefore, we decided to use this range in our algorithm. In other word, for any roughness score predicted by our algorithm, we can attribute a single frequency value. This single frequency will be used to draw our mid-air haptic and conveyed the predicted level of roughness. We will see in the next section, how we validated this.

E. Visuo-Haptic Matching Task

In the previous section we presented the last steps of our design pipeline, i.e. the relationship between perceived roughness and mid-air haptic patterns property. Coupled with our work on inferring roughness from visuals, we now have all the pieces to render the haptic roughness. In this visuo-haptic matching task, we will validate our approach. More specifically we designed a study aiming at comparing our algorithm output with the user expected haptic texture.

1. Method

In this study, participants were adjusting the texture of a mid-air haptic pattern to match the texture from the visual displayed on the screen. We recruited 21 participants (10 female, 11 male, mean age: 33±7.8) in our office. Each participant was sat at a desk, with in front of them a computer screen displaying the visual texture. On the side, an Ultrahaptics UHEV1 device was producing a mid-air haptic circle with a perimeter of 20 cm. Participants hands were tracked using a Leap Motion controller, so that mid-air haptic patterns are always positioned in the center of their middle finger. During the study, participants were wearing headphones that generated pink noise, as to avoid any influence from auditory cues. Using a computer mouse, participants could change the mid-air haptic properties via a cursor displayed below the interface. Effectively, the cursor changed the draw frequency of the mid-air haptic pattern, yet the participants did not know this. Instead, the cursor was labelled as "rough/smooth". Participants were instructed to change the haptic roughness until it matched that of the presented visual. After validation, the visuals were replaced with new visuals and participants repeated the task. In total, participants determined the haptic roughness of 9 visual stimuli. These visual stimuli were the same images as from our previous test-set (see Model Performance section). The study was approved by our internal ethics committee.

2. Results

As in the previous study, we examine how accurate our model could predict draw frequency, compare to the values obtained during the study. To achieve this a linear regression was conducted on observed value vs predicted values.

Figure 10:
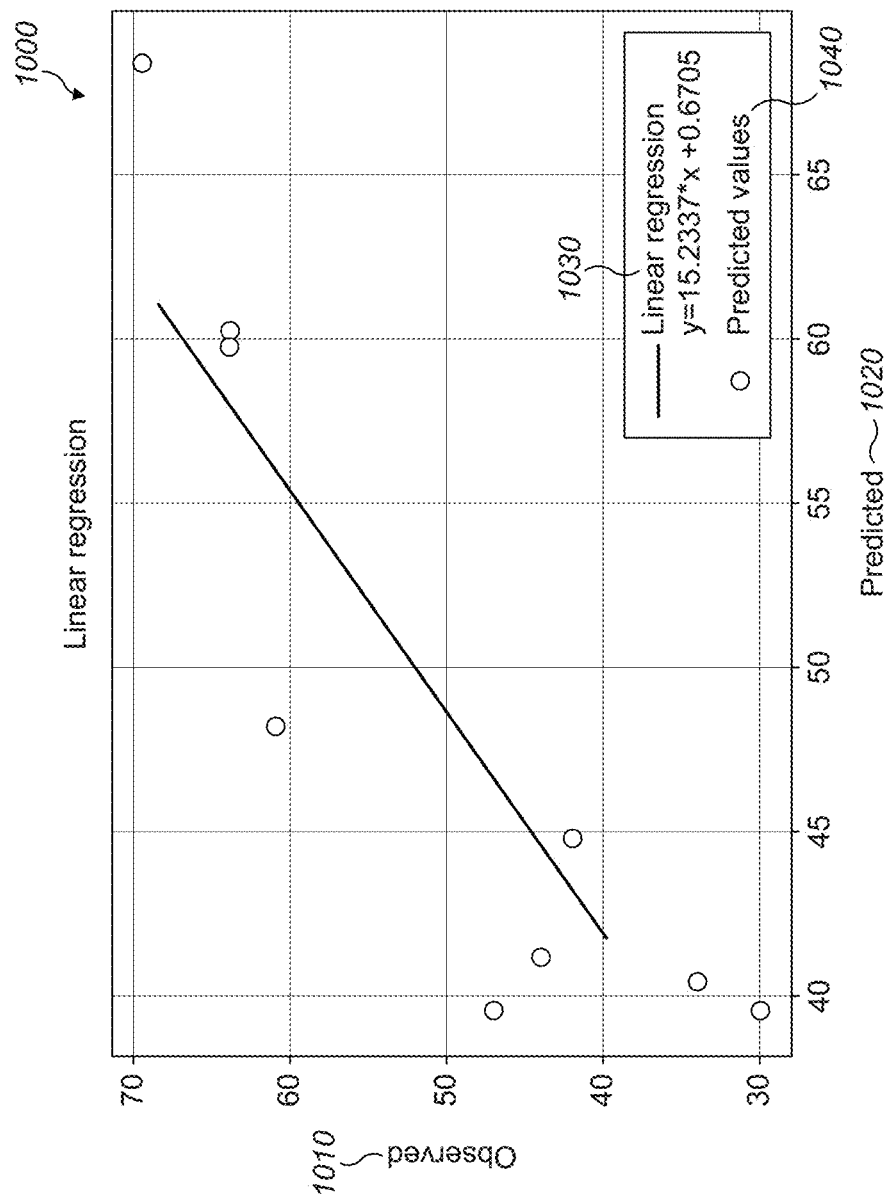
FIG. 10 is a linear regression conducted on observed value versus predicted values of study data.

Turning to FIG. 10, shown is a graph 1000 with an x-axis 1020 of predicted values and a y-axis 1010 of observed values. The plot 1030 and predicted values 1040 display linear regression between determined median draw frequency values and predicted draw frequency values from our model. An $R^2$ value of 0.76 and a mean absolute error of 5.6 were observed.

Collected data from our validation were not normally distributed when assessed using their corresponding box plots and Shapiro-Wilk tests for normality (p<0.05 for all). Firstly, Spearman's rank-order correlation test was run so that the relationship between our model's predictions on haptic roughness could be evaluated against data captured during our visuo-haptic matching study. Similar to comparisons made between crowd-sourced median subjective roughness and predictions, a statistically significant, very strongly positive correlation was found between our model's prediction and participant's median haptic roughness assessments, $r_s(9)$=0.933, p<0.001.

It was critical to measure whether the estimation of mid-air haptic feedback varied in contrast to the visual only assessments of roughness captured during our crowd-source exercise. This information would provide an insight towards the feasibility that purely visual roughness information can be translated to the tactile domain using mid-air ultrasonic haptic feedback. Mann-Whitney U tests were run on comparisons between crowd-sourced visual roughness data and visuo-haptic roughness data. Data sets were different sizes, however Mann-Whitney testing is robust to unequal sample sizes. Additionally, values were scaled differently between data sets, therefore in order to draw any comparisons, visuo-haptic matching roughness values were transformed to fit the 0-100 range of the visual roughness scale. Table 2 shows median, and inter-quartile values for both haptic roughness data and visual subjective roughness data from our crowd-sourced study. Assessments of Mann-Whitney results demonstrate that 3 of the 9 images were similar during visual roughness assessment and visuo-haptic matching. Of the remaining 6 images, 4 of these (cork: p=0.008, denim: p<0.001, paper plate 2: p<0.001, and silk 1: p=0.009), visual assessments produced significantly higher perceived roughness values than during the visuo-haptic matching task. In contrast, the remaining 2 image textures, (metal mesh: p<0.001, plastic mesh 2: p=0.01), produced significantly lower values of perceived roughness than during the visuo-haptic matching task.

TABLE 2

| Texture Name | Haptic Roughness (Transformed) | Visual Roughness | Mann-Whitney |
| --- | --- | --- | --- |
| brick 2 | M = 28, IQR = [11-59(48)] | M = 36.36, IQR = [20-63(43)] | 0.051 |
| bubble envelope | M = 11, IQR = [2-22(20)] | M = 14.44, IQR = [6-30(24)] | 0.061 |
| cork | M = 62, IQR = [36-76(40)] | M = 68.68, IQR = [45.8-89(43.2)] | 0.008 * |
| denim | M = 56, IQR = [32-68(36)] | M = 68.45, IQR = [55-82(27)] | <0.001 * |
| glitter paper | M = 66, IQR = [42-76(34)] | M = 61.39, IQR = [36-72(36)] | 0.167 |
| metal mesh | M = 90, IQR = [78-96(18)] | M = 74.61, IQR = [51.1-89(37.9)] | <0.001 * |

TABLE 2-continued

| Texture Name | Haptic Roughness (Transformed) | Visual Roughness | Mann-Whitney |
|---|---|---|---|
| paper plate 2 | M = 22, IQR = [11.5-34(22.5)] | M = 30.00, IQR = [17-53.6(36.6)] | <0.001 * |
| plastic mesh 2 | M = 82, IQR = [72-92(20)] | M = 74.71, IQR = [55-88.9(33.9)] | <0.010 * |
| silk 1 | M = 22, IQR = [10-32(22)] | M = 28.16, IQR = [14-45.8(31.8)] | 0.009 * |

Table 2: Mann-Whitney group differences between crowd-sourced subjective roughness data (0-100) and validation study haptic draw frequency data (scale transformed). Median, and IQR values are reported.

Finally, analysis of comparisons between data obtained during the visuo-haptic matching task and crowd-sourced visual roughness data using one sample Wilcoxon tests on each of the 9 test set images. Table 3 displays median, inter-quartile ranges, and Wilcoxon statistical values for each image. Comparisons showed that for 4 images, (brick: p<0.001, cork: p=0.038, denim: p<0.001, and silk 1: p<0.001), predicted haptic roughness from our model was significantly lower than haptic roughness during the visuo-haptic matching task. Moreover, predicted haptic roughness for 1 image, (metal mesh: p=0.005), was significantly higher than haptic roughness during the visuo-haptic matching task. All other comparisons, (bubble envelope, glitter paper, paper plate 2, plastic mesh 2) were similar.

TABLE 3

| Texture Name | Haptic Roughness | Predicted Roughness | Wilcoxon |
|---|---|---|---|
| brick 2 | M = 61.00, IQR = [45.5-69.5(24.0)] | 49.96 | <0.001 * |
| bubble envelope | M = 69.50, IQR = [64.0-74.0(10.0)] | 67.66 | 0.611 |
| cork | M = 44.00, IQR = [37.0-57.0(20.0)] | 42.25 | 0.038 * |
| denim | M = 47.00, IQR = [41.0-59.0(18.0)] | 40.82 | <0.001 * |
| glitter paper | M = 42.00, IQR = [37.0-54.0(17.0)] | 45.00 | 0.744 |
| metal mesh | M = 30.00, IQR = [27.0-36.0(9.0)] | 35.12 | 0.005 * |
| paper plate 2 | M = 64.00, IQR = [58.0-69.25(11.25)] | 64.38 | 0.763 |
| plastic mesh 2 | M = 34.00, IQR = [29.0-39.0(10.0)] | 35.71 | 0.110 |
| silk 1 | M = 64.00, IQR = [59.0-70.0(11.0)] | 59.97 | 0.001 * |

Table 3: One sample Wilcoxon signed rank test comparisons between median roughness (draw frequency ranging from 25 Hz to 75 Hz), and predicted roughness from our model. Median and IQR values are reported.

F. Discussion

In this section, we further discuss the results of our work. We also take the opportunity to share some insights we discovered while carrying out our investigations.

1. Results

As reported above and in table 1, our algorithm predicts the subjective roughness of each picture with great accuracy ($R^2$=0.926). The mean absolute error (MAE) is only of 4.25. Furthermore, the roughness ranking is respected between user ratings and algorithms predictions (Spearman's rank correlation coefficient=0.92). These values show that our model successfully predicts visual subjective texture.

However, one might note the high IQR for each of the textures and challenge these conclusions. Based on this observation and these insights, one may be tempted to further perfect the predictive model, or repeat the data collection process with a different methodology. These are valid options but looking closer at our data, one can argue and attribute this high IQR according to different factors, independent of our approach.

First, recall that our crowd-sourced study spanned an average over 50 minutes, which can lead to participants becoming less focused on the task towards the end of the study. With this decreased focus in mind, it is likely that the validity of their ratings decreased, too. However, we think that our high number of participants, and the fact that picture order was randomized, the effect of fatigue was limited. Another aspect to consider is the close resemblance between several of the textured images contained with the HaTT database. As discussed previously, constraints were applied to the image in order to facilitate the training of our predictive model. The resulting data set is therefore rather abstract and so subjective, and it is possible that it evoked slightly different sensations for each individual participant. In a way it is a phenomenon similar to abstract art, where two people that appreciate a particular artwork may have very different emotional responses and impressions regarding the same piece of art. Finally, texture, and especially roughness, is intrinsically an abstract notion whose subjectivity makes it difficult to grasp using a qualitative analysis such as these. It is not surprising that variation was obtained in the ratings. We develop this last point further in the next section. We would like to stress at this point that this result is a contribution on its own. While we applied this predictive model to mid-air haptics, the model could be applied to any other haptic devices capable of creating the tactile sensation of roughness.

In the evaluation study, we see a lower accuracy ($R^2$=0.76), but error remains similar (MAE=5.65) and the rank order is still respected ($r_s$=0.933). A loss in accuracy was to be expected, as our predictive model was trained on visual ratings only, and not visuo-haptic ratings. Combining our predictive model with the roughness-to-draw-frequency relationship can only be as accurate as the two components taken separately. The Mann-Whitney test presented in table 2 explain further this drop in accuracy. In most cases, participants gave a roughness ratings significantly different in the visuo-haptic matching task than in the visual rating task.

The one-sample Wilcoxon signed rank test provides more details in our model accuracy (see Table 3). Indeed, according to the test results, 5 out of the 9 textures tested are significantly different. The fact that more than half of the predictions are significantly different than the participants ratings could be seen as a failure of our model. However, recall that the mean absolute error is only of 5.65 Hz and needs to be compared to the participants vibrotactile perceptual resolution. According to a review on psychophysical studies in haptic, the human just noticeable difference (JND) for vibrotactile frequency is around 3-30%. If we take the mean value and apply it to our range of frequency used in the study, we can deduce that in our case, human JND to haptic pattern is as big as 7.5 Hz. Since the human JND for vibrotactile feedback is greater than the mean absolute error of our model, it is unlikely that participants would be able to perceive them.

Finally, the low performance of our end-to-end algorithm could likely be explained in the rendering method used for our mid-air haptics stimuli. As said in the literature review, the two main parameters in vibrotactile stimulations influencing texture perception are frequency and waveform. In the current study, we used only frequency. It is likely that varying the waveform will allow for finer tuning of the perceived tactile roughness. However, further investigations would be required for establishing a new relationship between perceived tactile roughness and both frequency and waveform. We defer this for future work since the results reported herein are in our opinion promising and of interest to the community and could already be implemented in real world applications.

2. Insights and Limitations

We noticed that roughness ratings were not normally distributed from rough to smooth. Indeed, both in the visual ratings and the validation task, participants tend to give ratings that tend either towards rough or smooth, but not in-between. This might be due to the existing dichotomy in our language. In the English language, there are no adjectives describing different level of roughness. A material is either rough or smooth.

From this observation, one could hypothesize that roughness accuracy in the tactile part is not that important. According to modality appropriateness it is likely that the main texture judgement comes from visual cues as opposed to tactile ones, as vision possess greater spatial acuity. Therefore it is fine to limit tactile roughness to a limited amount of levels spreading from rough to smooth. Provided comparative assessments between two materials with similar perceptual assessments of roughness, such an approach is viable. This has great implications for modern day applications, while research in mid-air haptic texture rendering closes the gap with visual texture rendering.

Finally, we would like to note that one limitation of our approach is that we only focus on texture roughness among all other possible dimensions of texture. More specifically we discuss micro-roughness prediction and rendering, and omit macro-roughness, which encompasses the elements with spatial resolution greater than a finger pad. Of course, one would expect that adding more texture dimensions to our model could increase realism and probably accuracy too. However, the approach described here could easily be applied to those dimensions as well. Addressing all three texture dimensions shared between vision and touch would have to extend beyond the scope of this paper, which has mostly focused on the proposed methodology, and its corresponding user validation, for the predicting and rendering of congruent visuo-haptic textures in mid-air.

G. Further Study

In this application, we have shown that visual texture roughness can correctly be predicted using our machine learning approach with 92% accuracy. Using results from perceptual studies, we have established a relationship between tactile roughness and mid-air haptic input parameters. Combining these, our approach was then shown to be able to predict the visual perceived roughness of a picture and use this prediction to generate the corresponding mid-air haptic input parameters that an ultrasound phased array device can interpret and output haptic feedback stimuli onto a user's hands. We have validated our approach via a user study and showed that our predictive model for rendering roughness in visuo-haptic setting was accurate at 76%. To the best of our knowledge, this is the first attempt to unify visual texture perception with that achieved by ultrasound mid-air haptic displays. In future work, we will expand our algorithm by enabling extra texture dimension to be predicted and conveyed through mid-air haptic technology. As discussed previously, such dimensions could include macro-roughness or hardness. We will also aim at assessing the benefits of our approach towards improving the user experience during spatial interaction with digital environments. To that end, one could imagine implementing our approach, or an improved iteration of it, in applications such as e-textiles in AR and VR thus opening up new possibilities in the field of human-fashion interaction (HFI).

III. Expressing Tactile Expectations of Visual Textures Via Mid-Air Haptic Feedback Prior research has established congruences in texture perception between human visual and haptic modalities. In reality, texture is perceived as an entirely integrated sensation, where aspects of both visual, tactile and auditory modalities influence one's response to a texture. Drawing on the utility of integrated multi-modal feedback, we propose a method that incorporates visual texture information to produce both haptic and auditory feedback. This procedure aims to produce entirely congruent multi-modal digital texture renderings, akin to those experienced in the real world.

A. The Method

As an overview, the method features an initial step which is the design and training of a visual texture dimension machine learning prediction and classification model. Secondly, a linear regression process is conducted in order to match visual texture dimension prediction values to specific haptic sensation attributes that have been validated to produce a particular haptic texture dimension. This procedure forms our haptic prediction model. Finally, utilizing the classification data for the associated visual textures, we develop an audio database and an associated rendering method to produce dynamic auditory feedback that is tied to the visual features within a texture image. Each step is detailed below.

1. Visual Texture Prediction Pre-Processing and Feature Extraction

As a preliminary step, this method first features a set of image textures (currently 98), of size 1024×1024 pixels (24 bits per pixel). These images are assessed by human users subjectively, and values of 0-100 are given for each of the following texture dimensions: roughness, bumpiness, hardness, stickiness, warmness. This stage also requires image data to be labelled, in order to assign each image to a specific texture group ('paper', 'wood', etc). This process can be done via crowdsourced means such as Amazon's Mechanical Turk (AMT). Following this procedure, data is assessed, cleaned, outliers are removed, then mean and standard deviation (or median and +—inter-quartile range) values are retained for each of the texture dimensions. This data is utilized for training and validation in subsequent steps.

Next, the image data set is subject to several pre-processing steps. Firstly, images are converted to gray-scale, and resized to 256×256 pixels (8 bit-per-pixel), using constant scaling. Next, gray-level co-occurrence matrices (size 256× 256) are calculated for a series of displacement vectors: distances (1, 2, 3, 4, 5, 6, 7, 8, 9, 10), and angles (0, 45, 90, 135). Once each matrix is calculated, a Chi-Square test is conducted on each of the matrices, and the displacement vector that produces the highest value is selected. This step is conducted in order to determine which displacement vector correctly identifies the structure within the image texture, allowing both the spacing and direction of the texture structure to be obtained.

Once a correct distance value is obtained, matrices for all angles (0, 45, 90, 135) are constructed. For a given angle, transposed matrices are also constructed in order to represent the relationship between pixels across the horizontal, vertical, and both diagonal directions. Matrices for the correct distance values and a given angles, plus each transpose matrix are summed and averaged in order to produce a symmetric and semi-direction invariant matrix. Values are then normalized so that the resultant matrix contains the estimated probabilities for each pixel co-occurrence.

Once this matrix has been produced, further second-order statistical measures are obtained, known as Haralick features. This feature set contains 3 distinct groups: Contrast, Orderliness, and Descriptives. We select singular values for each group, in order to ensure each texture measure was independent. Homogeneity is selected for Contrast, which produces a value between 0-1. This feature measures how close the distribution of elements in the GLCM are to the diagonal of the GLCM. Entirely diagonal gray-level matrices give a homogeneity of 1, and this value becomes large if textures contain only minimal changes in pixel values. Energy is selected as the Orderliness descriptor, where Energy is the square root of the matrix Angular Second Moment. Energy is a 0-1 value, where 1 represents perfectly ordered pixel co-occurrences. For the Descriptives group, we select the GLCM Mean, Variance, and Maximum Correlation Coefficient. In addition, the metrics Cluster Shade, and Cluster Prominence are included to measure the symmetry in each GLCM. The final output of this process is a set of 8 features that characterize the texture contained with a given image.

2. Visual Texture Prediction Model Architecture

In order to process both the GLCM and images, a network with 3 convolutional layers with ReLU activations, and He normal kernel initializers is constructed. The first convolutional layer applies a series of 16 7×7 filters to the image and GLCM, which is followed by a 4×4 max pooling layer to reduce the dimensionality of the image and GLCM data. Filter size is then reduced to a series of 16 3×3 in CNN layers 2 and 3. After CNN layer 2, another 4×4 max pooling layer is applied, with a final 2×2 max pooling layer after CNN layer 3. The subsequent output is then flattened and passed to a fully connected layer of 16-dimensions with ReLU activations, and L2 kernel regularization set to a value of 0.1 in order to minimize overfitting. This architecture is used for both GLCM and image feature data as separate input channels. Haralick feature data is processed using an MLP with 2 fully connected layers of 16-dimensions, and L2 kernel regularization applied to the second layer set to a value of 0.1, again to ensure overfitting is minimized. Each 16-dimension fully connected layer from the 3 models is then concatenated in order to return a single tensor passed to a fully connected layer with 3 dimensions and ReLU activations. The output layer generated uses a sigmoid activation function in order to output a predicted value of subjective roughness in the range of 0-100. The model is trained using the mean absolute error (MAE) between the predicted values and observed median subjective values obtained during the initial texture classification and dimension estimation exercise. For training, the Adam optimizer with Nesterov momentum and a learning rate of 0.0005 is implemented, and a batch size of 1 applied.

The same general architecture is applied in order to classify textures into specific groups. The primary difference is that group data is used as the dependent variable, as opposed to texture dimension mean/median values. In addition, the fully connected layer after concatenation utilizes 'softmax' activations. Furthermore, the output layer is no longer a sigmoid activation function, but rather categorical cross entropy is used.

3. Haptic Texture Prediction Model

Based on the output from the visual texture dimension prediction model, 0-100 values can be rendering using the Ultrahaptics mid-air haptic device. In the context of 'roughness', we convert a given prediction value to the draw frequency of a haptic sensation using a linear regression approach. The association of sensation draw frequency and haptic roughness has been validated using a perceptual user study. We map the image prediction scale (0-100) to the range of draw frequencies that define sensations between 'rough' and 'smooth'. This method can be extrapolated for additional texture dimensions.

B. Texture Classification and Auditory Feedback Associations

We propose that by training the Visual Texture machine learning model to output a group value for a given image texture, we can associate this output with a library of audio files, or synthesis parameters, for each texture group. This enables auditory feedback for an image texture, which can be further modulated via an image normal map. Firstly, a database of audio files can be referenced. In addition, appropriate parameters for an audio synthesis method (additive, subtractive, modal) can be obtained following the classification step. Utilizing an image normal map enables audio intensity and frequency modulation based on variations in the local features contained within each image texture. These sounds would be produced at the point of contact with a virtual texture and can be rendered via parametric audio via the Ultrahaptics mid-air device, or alternatively headphones may be used.

IV. Conclusion

While the foregoing descriptions disclose specific values, any other specific values may be used to achieve similar results. Further, the various features of the foregoing embodiments may be selected and combined to produce numerous variations of improved haptic systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method of rendering roughness in visuo-haptic mid-air textures, comprising:
   (1) forming a haptic prediction model by:
      (a) training a visual texture dimension machine learning prediction and classification model;
      (b) calculating a linear regression process to match visual texture dimension prediction values to validated specific haptic attributes to produce a particular haptic texture dimension;
   (2) using the prediction and classification model for the visual texture dimension prediction values, developing an audio database and an associated rendering method to produce dynamic auditory feedback that is tied to visual features within a texture image; and
   (3) converting image texture data to grayscale;
   wherein training a visual texture dimension machine learning prediction and classification model comprises obtaining the image texture data based on the subjective observations of a plurality of test subjects;
   wherein converting the image texture data to grayscale uses constant scaling;
   calculating gray-level co-occurrence matrices for a plurality of displacement vectors; calculating matrices for correct distance values and pre-determined angles;
   summing and averaging transpose matrices to produce a symmetric and semi-direction invariant matrix that is normalized so as to contain estimated probabilities for each pixel co-occurrence.

2. The method of claim 1, wherein calculating a linear regression process uses a network with convolutional layers with Rectified Linear Unit activations and He normal kernel initializers.

3. The method of claim 2, further comprising generating an output layer using a sigmoid activation function to output a predicted value of subjective roughness.

4. The method of claim 1, wherein using the prediction and classification model for the visual texture dimension prediction values comprises converting a prediction value to a draw frequency of a haptic sensation using a linear regression approach.

5. The method of claim 1, wherein dynamic auditory feedback that is tied to visual features within a texture image includes using audio intensity and frequency modulation based on variations in local features contained within the image texture.

6. The method of claim 5, further comprising:
   rendering the dynamic auditory feedback via parametric audio.

* * * * *